United States Patent [19]
Hiyama et al.

[11] Patent Number: 5,818,554
[45] Date of Patent: Oct. 6, 1998

[54] REFLECTIVE LIQUID CRYSTAL DISPLAY APPARATUS WHICH DOES NOT REQUIRE A BACK LIGHT

[75] Inventors: Ikuo Hiyama, Hitachi; Akira Arimoto, Kodaira; Katsumi Kondo, Hitachinaka; Osamu Itoh, Hitachi; Tatsuhisa Fujii, Mobara, all of Japan

[73] Assignee: Hitachi, Ltd., Tokyo, Japan

[21] Appl. No.: 458,660

[22] Filed: Jun. 2, 1995

[30] Foreign Application Priority Data

| Jun. 9, 1994 | [JP] | Japan | 6-127295 |
| Jun. 17, 1994 | [JP] | Japan | 6-135323 |
| Sep. 20, 1994 | [JP] | Japan | 6-224574 |

[51] Int. Cl.$^6$ .................................. G02F 1/1335
[52] U.S. Cl. .................. 349/67; 349/106; 349/113
[58] Field of Search .................. 359/49, 68, 70; 349/67, 106, 113

[56] References Cited

U.S. PATENT DOCUMENTS

| 4,185,895 | 1/1980 | Stephens et al. | 359/70 |
| 4,560,241 | 12/1985 | Stolov et al. | 359/68 |
| 4,708,440 | 11/1987 | Kugo et al. | 359/68 |
| 4,743,099 | 5/1988 | Dickerson et al. | 359/68 |
| 5,103,332 | 4/1992 | Kaneko et al. | 359/68 |
| 5,128,787 | 7/1992 | Blonder | 359/70 |
| 5,182,663 | 1/1993 | Jones | 359/70 |

FOREIGN PATENT DOCUMENTS

| 0545705 | 6/1993 | European Pat. Off. | 359/49 |
| 5-005864 | 1/1993 | Japan | 359/70 |

*Primary Examiner*—William L. Sikes
*Assistant Examiner*—Julie Ngo
*Attorney, Agent, or Firm*—Antonelli, Terry, Stout, & Kraus, LLP

[57] ABSTRACT

A reflective liquid crystal display apparatus has a liquid crystal display part composed of at least a liquid crystal layer and a pair of polarizers holding the liquid crystal layer therebetween, for display of bright and dark states in a mode of transmitting and shielding external light in a direction approximately normal to a display plane, and a reflecting part for reflecting the external light which has been transmitted through the liquid crystal display part. The liquid crystal display part has a property where it can transmit external light in a designated direction other than in a direction approximately normal to the display plane even in a mode of shielding the external light, and the reflecting part reflects the external light received in the designated direction so as to transmit the external light once again through the liquid crystal display part in a direction approximately normal to the display plane.

16 Claims, 20 Drawing Sheets

FIG. 7(a)
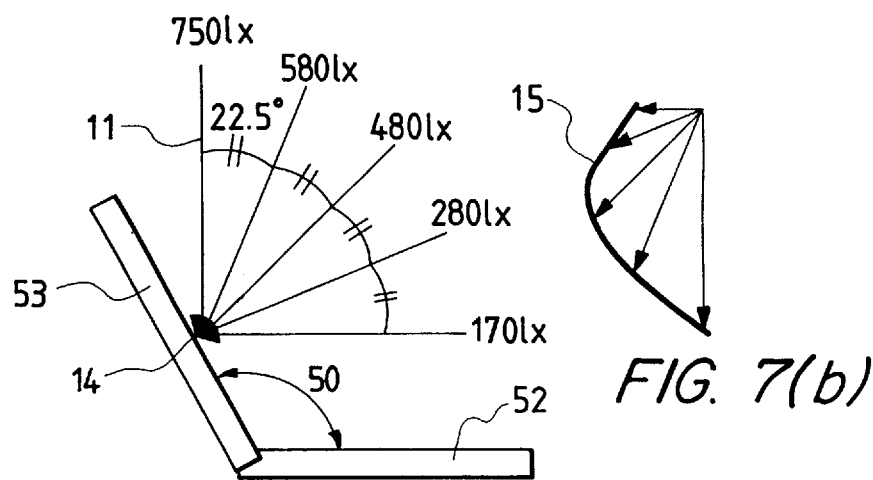
FIG. 7(b)
FIG. 8(a)
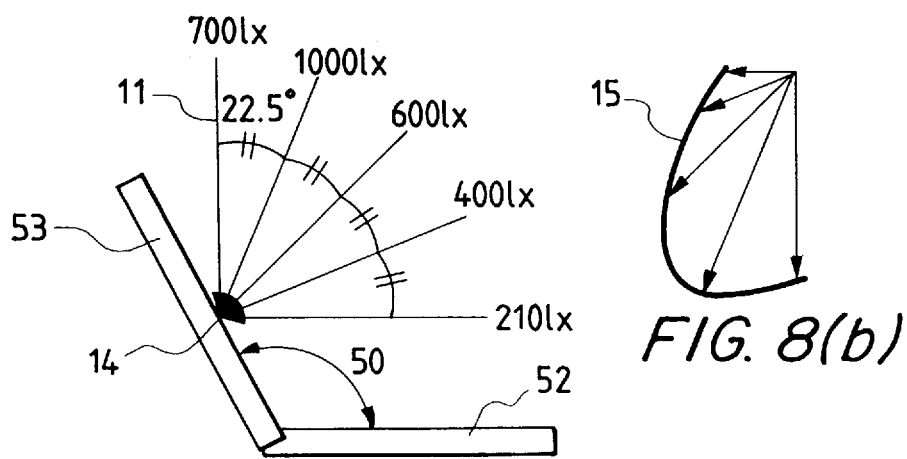
FIG. 8(b)

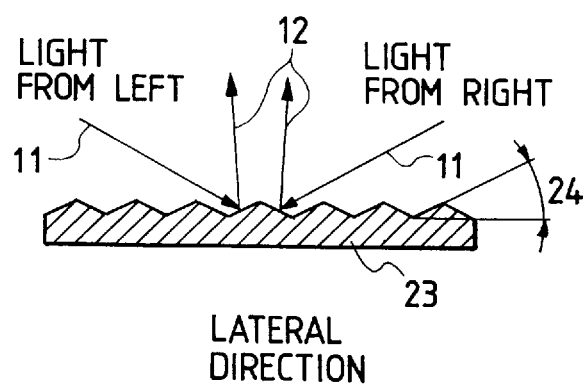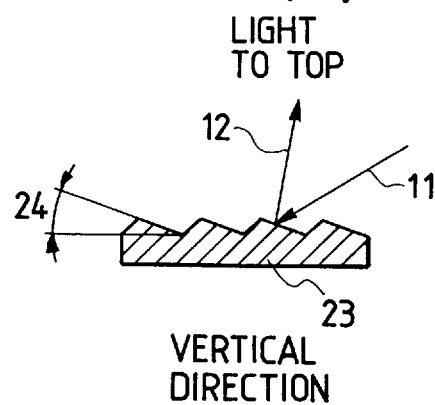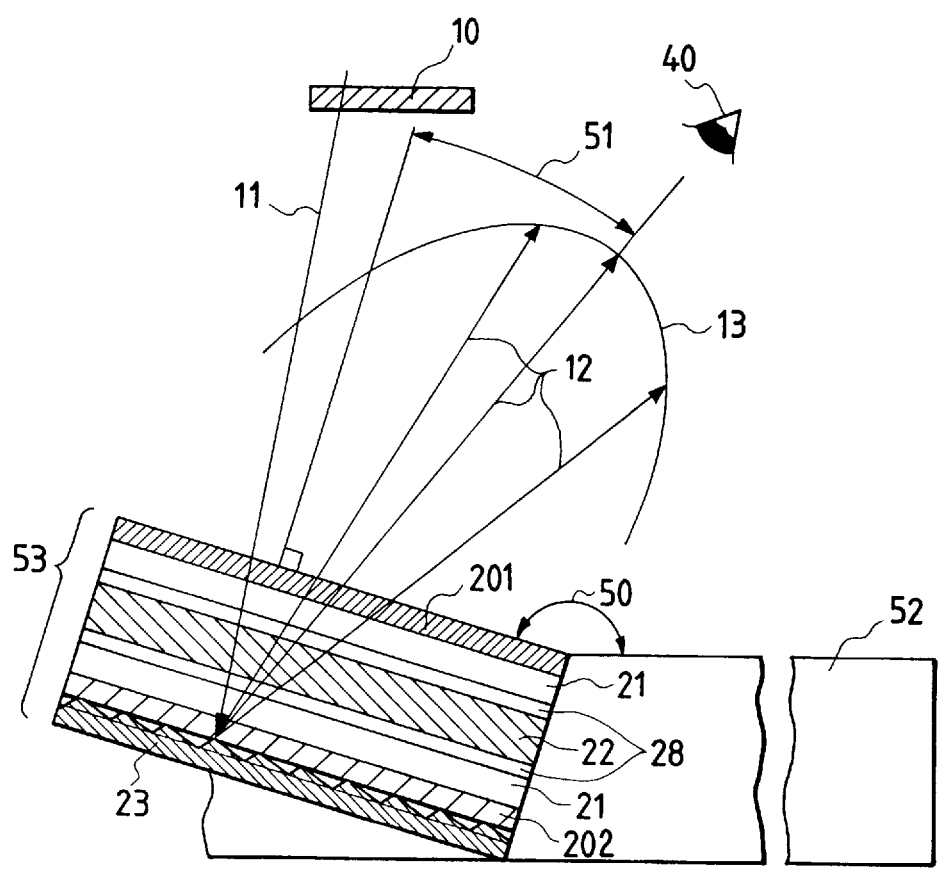

REFLECTIVE LIQUID CRYSTAL DISPLAY APPARATUS WHICH DOES NOT REQUIRE A BACK LIGHT

BACKGROUND OF THE INVENTION

The present invention relates to a reflective liquid crystal display apparatus of low power consumption, which do not require back light, and especially, to reflective color liquid crystal display apparatus.

Referring to FIG. 24, the composition of conventional reflective liquid crystal display apparatus will be explained hereinafter. The reflective liquid crystal display apparatus is composed roughly of two parts: display part 53 and processing part 52. The display part 53 comprises liquid crystal display part 30 and diffused reflector 37, and operates to display images. The processing part 52 operates to process information. Further, the liquid crystal display part 30 comprises substrates having a liquid crystal layer 22 disposed therebetween.

In consideration of the display part 53 of the reflective liquid crystal display apparatus, which is composed as described above, a main portion of the external light incident over the display part 53 is incident light 11 directed downward from above in an office environment where lights 10 are arranged mainly at the office's ceiling. And, the incident light is reflected by a diffused reflector 37 to form reflected light 12. For this purpose, the diffused reflector 37 has a reflecting plane which is roughened to have a scattering property. Further, the distribution of the reflected light 13 has a peak in the horizontal direction along the processing part 52. That is, the incident light 11 is reflected only partly toward a position 40 where the user's eyes are positioned, and consequently, the display produced by the display part 35 may appear somewhat dark to the user.

Accordingly, in order to utilize external light from the lights 10 effectively in an office environment for obtaining a bright reflective liquid crystal display, the peak of the distribution of the reflected light 13 must be oriented toward the eyes of the viewer at position 40.

A technique to resolve the above described problem was disclosed in JP-A-4-274217 (1992). This technique uses a reflector manufactured with blaze grooves on the surface of the reflecting plane having a directivity which will orient the peak of the reflected light toward the viewer.

Another technique was disclosed in JP-A-4-212124 (1992). In accordance with this technique, a fiber optic face plate for conducting light in a designated direction and a reflector are provided behind the liquid crystal layer for orienting the peak of the reflected light toward the viewer.

However, the former technique has a problem in that the brightness can not be enhanced sufficiently because the external light, which includes a large quantity of light directed downward from above, is shielded in a display mode having a low light transmissivity, is prevented from reaching the reflector with a desired directivity, and consequently is not reflected toward the viewer.

And, in the latter technique, the incident light directed into the fiber optic face plate diffuses into an acceptance cone, is transmitted through a passage of light, such as the liquid crystal layers, substrates, and reflecting passage from the reflector, and consequently, a lower brightness occurs.

Further, neither of the prior techniques provided any teaching concerning the problem relating to loss of light by a color filter, and so unresolved problems remain in relation to a reflective color display.

SUMMARY OF THE INVENTION

A first object of the present invention is to provide a bright reflective liquid crystal display apparatus of low power consumption, which does not require back light by transmitting a large quantity of external light.

A second object of the present invention is to provide a reflective color liquid crystal display apparatus having bright and clear colored images, wherein the external light is not absorbed by the color filter to any significant extent.

The reflective liquid crystal display apparatus of the present invention comprises a liquid crystal display part including at least a liquid crystal layer and a pair of polarizers sandwiching the liquid crystal layer therebetween, which displays black and white states in respective modes by transmitting or shielding external light in a direction approximately normal to the display plane, and a reflecting part for reflecting external light transmitted through the liquid crystal display apparatus, wherein the liquid crystal display part has transmission characteristics which transmit the light in a designated direction even in a shield mode for the external light, except for the external light directed in a direction approximately normal to the display plane, and the reflecting part has means for reflecting the light from a designated direction transmitted through the liquid crystal display part in a direction approximately normal to the display plane.

The reflective color liquid crystal display apparatus of the present invention comprises a liquid crystal display part including at least a liquid crystal layer which displays black and white state by transmitting or shielding external light, reflecting means for reflecting external light transmitted through the liquid crystal display apparatus, and color filters which transmit the external light. The color filters comprise a stripe filter for each color wherein the stripes are arranged so that the direction of the stripe in the stripe filter is parallel to a plane including the tracks of transmitting incident external light and light reflected by the reflecting means. Further, the color filters can be arranged in an adhered form directly onto a reflecting plane of the reflecting means.

In accordance with the features described above, the liquid crystal layer exhibits a characteristic which is not effected by display modes, such as when no voltage is being applied (transmittance) and voltage is being applied (shield), that is, a transmitting characteristic wherein external light in a direction other than the direction approximately normal to the display plane, can be transmitted even in a mode for shielding external light, and this enables a large quantity of external light from above, that is the external light from a designated direction, to be transmitted through the liquid crystal display part effectively.

Accordingly, external light in a large quantity is reflected by the reflecting means toward the viewer, i.e. in a direction normal to the display plane, and when the liquid crystal display means is transmissive again, transmittance (bright) and shield (dark) states are clearly displayed depending on the substantial transmitting characteristic in the direction approximately normal to the display plane. Therefore, a bright display having a high contrast can be realized, and bright display characteristics which make a back light unnecessary can be obtained.

Further, when the color filter in the reflective color liquid crystal display apparatus is a stripe color filter provided for each color, the incident light and the reflected light passing through the filter can be made to pass through the color filter of same color by arranging the stripes so that the direction of the stripe in the stripe filter is in parallel to a plane including tracks of transmitting incident external light and light reflected by the reflecting means. Therefore, a decrease in the brightness due to an absorbing of the light can be avoided.

Furthermore, when the color filter is arranged so as to adhere directly to the reflecting plane of the reflecting means, the point of transmission of the incident light and the point of reflection of the reflected light are approximately identical, and accordingly, the incident light and the reflected light always pass through the color filter of the same color, and the same advantage as described above can be obtained.

Next, in order to obtain a bright display in the reflective display apparatus, a method wherein a contrast ratio toward the viewer is increased by increasing the transmissivity of the external light, which represents a large quantity of light in a designated direction, will be explained in detail hereinafter.

First, the issue for increasing transmissivity of light in an incident direction in order to increase the contrast ratio toward the viewer will be explained. In consideration of the brightness of the reflective liquid crystal display apparatus, both the reflectance of the reflector and the angular dependence of the liquid crystal element on transmissivity must be considered. The brightness of the reflective liquid crystal display apparatus can be explained with reference to a model of the display part 53 as shown in FIG. 25.

The distribution 90 of brightness of the external light is expressed by $L(\theta, \phi)$, the transmissivity of the external light in the incident direction at the liquid crystal display part 30 is expressed by $T(\theta, \phi)$, the reflectance of the diffused reflector 37 is expressed by $R(\theta, \phi, \theta', \phi')$, and the transmissivity of liquid crystal element toward the viewer is expressed by $T(\theta', \phi')$. Where, $\theta$ is an angle to the vertical direction in the plane of FIG. 25, $\phi$ is the azimuth to the display plane of the liquid crystal element, $\theta$ and $\phi$ are angles of the incident light, and $\theta'$ and $\phi'$ are angles toward the viewer.

If the brightness 91 of the reflective liquid crystal display apparatus is taken as $L(\theta, \phi, \theta', \phi')$, the $L(\theta, \phi, \theta', \phi')$ can be expressed by the following equation;

$$L(\theta, \phi, \theta', \phi') = L(\theta, \phi) \times T(\theta, \phi) \times R(\theta, \phi, \theta', \phi') \, T(\theta', \phi') \quad (1)$$

Accordingly, in order to enhance the brightness and to increase the contrast ratio of the reflective liquid crystal display apparatus, in the above equation (1), all of $L(\theta, \phi)$, $T(\theta, \phi)$, $R(\theta, \phi, \theta', \phi')$, and $T(\theta', \phi')$ must be increased respectively at bright display points and all of $L(\theta, \phi)$, $T(\theta, \phi)$, $R(\theta, \phi, \theta', \phi')$, and $T(\theta', \phi')$ must be decreased respectively at dark display points. However, the only variable factors subject to the voltage applied to the liquid crystal element are $T(\theta, \phi)$ and $T(\theta', \phi')$.

Therefore, as $L(\theta, \phi)$ and $R(\theta, \phi, \theta', \phi')$ are independent of the voltage applied to the liquid crystal element, it is necessary to increase $T(\theta, \phi)$ and $T(\theta', \phi')$ respectively at the bright display points and to decrease $T(\theta, \phi)$ and $T(\theta', \phi')$ respectively at the dark display points.

However, in a case of a divided pixel, as shown in FIG. 26, for instance, if the pixel 72 displays a dark image and the pixel 73 displays a bright image, the incident light 11 from an oblique angle will pass through an adjacent pixel because the substrate 21 has a thickness. Accordingly, the pixel is affected by the display image of the adjacent pixel.

In order to increase the contrast ratio and to obtain a bright display without influence from the above effect, both of $T(\theta, \phi)$ and $T(\theta', \phi')$ must be increased in a bright display, and both of $T(\theta, \phi)$ and $T(\theta', \phi')$ must be decreased in a dark display. However, the above described control is very difficult.

Therefore, in accordance with the present invention, the above described problem is resolved by a method wherein the reflectance toward the viewer, i.e. $R(\theta, \phi, \theta', \phi')$ is increased by increasing the transmissivity, i.e. $T(\theta, \phi)$, of the incident light into the liquid crystal element from an oblique angle independent of whether a voltage is applied (transmittance) or not applied (shield) to the liquid crystal element.

Further, in accordance with the reflective liquid crystal display apparatus of the present invention, a waveguide plate is provided on the surface of the liquid crystal display part so as to guide light from the overhead direction of the liquid crystal display apparatus to a display surface of the liquid crystal display part.

According to the above features, a large quantity of external light can be projected into the liquid crystal display part, and the intensity of light visible to a user's eyes, i.e. the brightness of the display apparatus, can be improved. First, a flat plate shaped transparent body (called a waveguide plate herein) is provided on or above the surface of a liquid crystal panel, and light projected from overhead in an office is taken into the waveguide plate and guided to the liquid crystal panel. In order to take as large a quantity of the light as possible from overhead in the office into the waveguide plate, the face of the waveguide plate must be installed with an angle at most 45 degree to the horizontal plane. Further, in order to guide as large a quantity of incident light as possible to the liquid crystal panel from below the waveguide plate, a device having a refractive effect, such as a microprism, is preferably provided below the waveguide plate.

In accordance with the above features, further intense light can be projected into the liquid crystal panel. In order to make the display even brighter, a reflector having unsymmetrical reflective characteristics may be used for reflecting the light in a transverse direction with respect to the surface of liquid crystal cells, that is, in a direction toward the user's eyes, in consideration of the fact that the guided light passing through the waveguide plate is projected into the liquid crystal panel from a somewhat upper portion of the panel. As for the reflector, for instance, a fine reflector installed in a somewhat oblique position directed upward may preferably be used.

If the efficiency of the external light utilization can be increased significantly, a reflective color display can be available even if there may be some absorption of light by the color filters. In order to have as much of the light as possible to pass into the liquid crystal panel, the cell may preferably have a structure wherein a light shielding layer between adjacent color filters, which are normally installed in a conventional transmission type display, is eliminated to form a light transmission region, and the light is received through the region. As for the display mode of the liquid crystal, a normally open type mode, wherein the transmissivity of light at a non-electrode portion where the voltage is zero, is desirable. The area of a region between adjacent color filters for guiding light is desirably somewhat high, and the ratio is preferably at least 20%.

Further, in accordance with the reflective liquid crystal display apparatus of the present invention, a reflective waveguide plate is provided below the liquid crystal display part so as to reflect and guide the light directed from the top direction of the liquid crystal display apparatus to the display surface of the liquid crystal display part.

According to the above features, the brightness of the display apparatus can be improved to achieve the above described advantage.

In order to introduce as large a quantity of the light as possible from the upper portion of the office into the reflective waveguide plate, the face of the reflective waveguide plate must be installed at an angle which is at most 45 degrees to the horizontal plane. Further, in order to introduce as large a quantity of incident light as possible to the liquid crystal panel from the reflective waveguide plate, the reflective waveguide plate is preferably composed of finely declined mirrors. In accordance with the above composition, a more intense light can be projected into the liquid crystal panel. In order to make the display even brighter, a reflector having unsymmetrical reflective characteristics is used for reflecting the light in approximately a direction transverse to the surface of the liquid crystal cells, that is, in the direction of the user's eyes, in consideration of the fact that the guided light through the waveguide plate is projected into the liquid crystal panel from a somewhat lower portion of the panel. As for the reflector, for instance, a fine reflector installed in a somewhat oblique position directed downward may preferably be used.

BRIEF DESCRIPTION OF THE DRAWINGS

These and other objects, features and advantages of the present invention will be understood more clearly from the following detailed description with reference to the accompanying drawings, wherein:

FIGS. 7(a) and 7(b) are diagrams indicating the distribution of illuminance in a direction transverse to the display part 53;

FIGS. 8(a) and 8(b) are diagrams indicating the distribution of illuminance in a direction transverse to the display part 53;

FIGS. 19(a) and 19(b) are enlarged cross sections of the blaze reflector shown in FIG. 18;

FIG. 20 is a side view partially in cross section illustrating the composition of a reflective color liquid crystal display apparatus forming still another embodiment of the present invention;

DETAILED DESCRIPTION OF THE EMBODIMENTS

Figure 1:
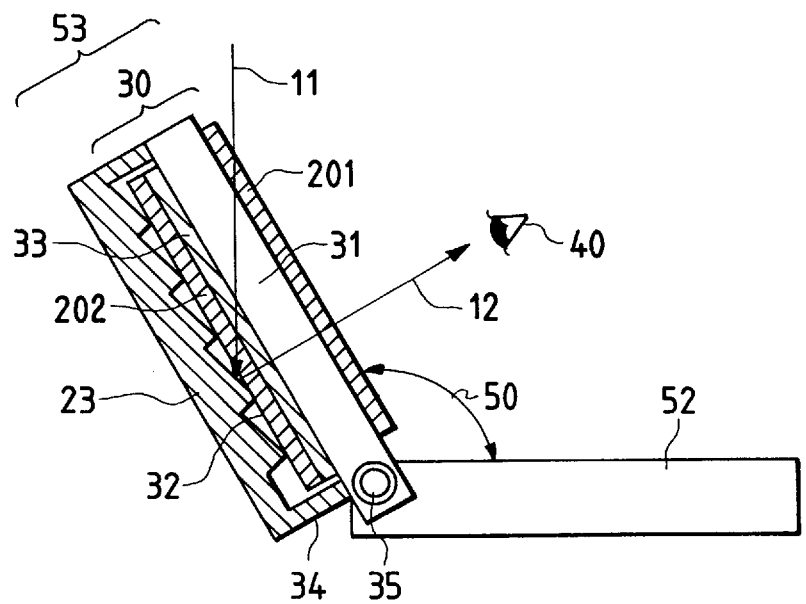
FIG. 1 is a side view partially in cross section indicating the composition of a reflective color liquid crystal display apparatus in accordance with the present invention.

Referring to the drawings, embodiments of the present invention will be explained hereinafter.

FIG. 1 is a partial cross view illustrating the composition of a reflective color liquid crystal display apparatus forming an embodiment of the present invention. The reflective color liquid crystal display apparatus is an example of the present invention, and comprises a display part 53 and a processing part 52, the display part 53 and the processing part 52 connected to each other by a hinge 35 for setting a viewing angle 50 for the display part 53.

The display part 53 is composed of a liquid crystal display part 30 comprising polarizers 201 and 202, liquid crystal elements 31, a transparent matching agent 32 and color filters 33; a blaze reflector 23; and an adhesive agent 34. That is, the polarizers 201 and 202 are arranged on respective sides of the liquid crystal element 31, and color filters 33 are arranged between the liquid crystal element at the blaze reflector 23 side and the polarizer 202. For a reflective monochrome liquid crystal display apparatus, the color filters 33 are omitted. Hereinafter, reference to a reflective liquid crystal display apparatus includes both the monochrome and color types.

The transparent matching agent 32 is arranged between the polarizer 202 and the blaze reflector 23, and the edge portion of the display part 53 is fixed with the adhesive agent 34. And, the reflective color liquid crystal display apparatus is provided with a keyboard and processor in the processing part 52 for inputting and processing information.

In the above composition, the incident light from the overhead direction, as shown by an arrow 11 in FIG. 1, enters into the display part 53, is transmitted through the liquid crystal element 31, is reflected by the blaze reflector 23 to form reflected light 12, and is projected toward a viewer 40 in a direction toward the position of the user's eyes. Under a general condition of use, the incident light 11 is received from the overhead direction and the reflected light 12 is directed in a direction generally perpendicular to the display part 53.

In order to decrease the reflection at the bottom plane of the polarizer 202, the matching agent 32 having a refractive index close to that of the polarizer 202, i.e. a protection film, is selected. As for the matching agent 32, PC (polycarbonate), PMMA (polymethyl methacrylate), silicone oil, and the like may be used. The above selection is aimed at avoiding any possibility of decreasing the incident light 11 arriving at the blaze reflector 23 so as to ensure the attainment of bright display characteristics.

Figure 2:
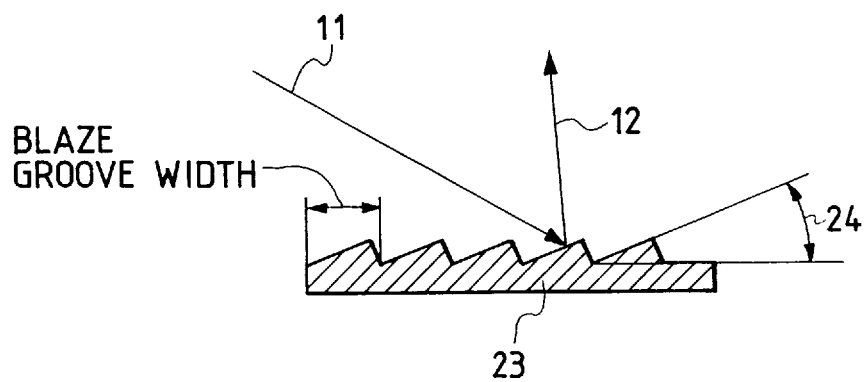
FIG. 2 is a detailed view in cross section of blaze reflector 23 in the apparatus shown FIG. 1.

FIG. 2 a cross section of blaze reflector 23 in the apparatus shown FIG. 1. As shown in FIG. 2, the blaze reflector 23 has regularly spaced on one side thereof inclined blaze shaped reflecting planes (called a blaze plane hereinafter) like a wash board. In the present embodiment, the blaze angle was selected to be 20 degrees, and the blaze groove width, i.e. the pitch of the grating, was selected to be 35 $\mu$m.

Figure 3:
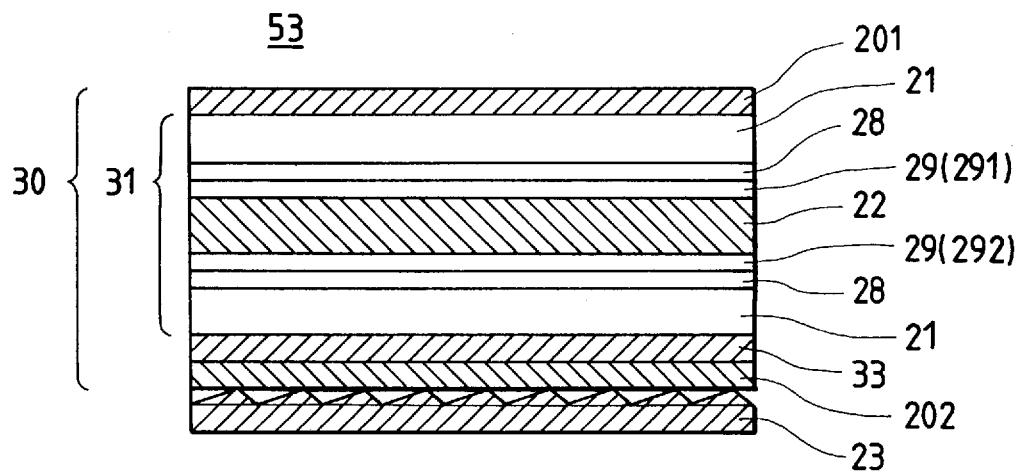
FIG. 3 is a cross sectional view indicating the detailed composition of the display part 53 shown in FIG. 1.

FIG. 3 is a cross section indicating the detailed composition of the display part 53 shown in FIG. 1. The display part 53 comprises the liquid crystal display part 30 forming a means for liquid crystal display and the blaze reflector 23 providing a means for reflection. The liquid crystal display part 30 has a composition wherein the first polarizer 201, the liquid crystal element 31, the color filter 33, and the second polarizer 202 are sandwiched. And, the liquid crystal element 31 has a composition wherein a substrate 21, an electrode 28, and an alignment-layer 29 are provided on either side of the liquid crystal layer 22, as shown in FIG. 3. That is, the liquid crystal layer 22 comprising a nematic liquid crystal is sandwiched between a pair of transparent substrates 21 having the transparent electrode 28 and the alignment layer 29 at facing planes respectively. Where, the polarizer 201 positioned at the display surface side of the display part 53 is called the first polarizer, and the polarizer 202 positioned at the blaze reflector 23 side of the display reverse surface of the display part 53 is called the second polarizer. Further, the alignment layer 291 positioned at the display surface side is called the first alignment layer, and the alignment layer 292 positioned at the display reverse surface side is called the second alignment layer.

Figure 4:
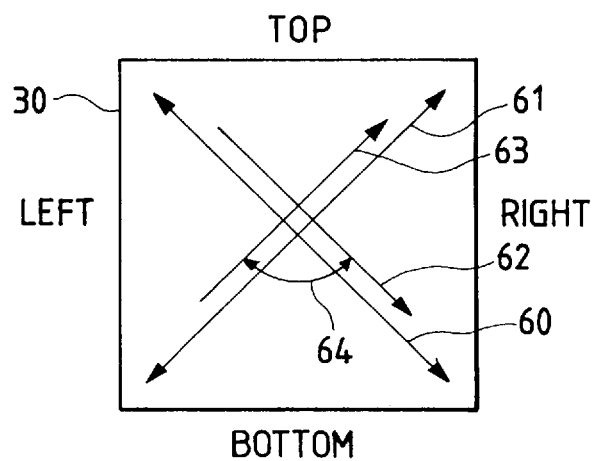
FIG. 4 is an illustration indicating a relationship among the first and the second polarizers and the first and the second alignment layers.

FIG. 4 is an illustration indicating the relationship between the first and the second polarize and the first and the second alignment layers based on the vertical and lateral directions of the display part 53 shown in FIG. 4. As shown in FIG. 4, the first and the second alignment layers 291, 292 are arranged so that the rubbing direction 62 of the first alignment layer and the rubbing direction 63 of the second alignment layer form a designated twist angle 64. Similarly, the first polarizer 201 and the second polarizer 202 are arranged so that an absorbing axis 60 of the first polarizer and an absorbing axis 61 of the second polarizer form a designated crossing angle.

A vector sum of the first and the second rubbing directions has a similar direction as the direction which divides equally an angle formed by crossing the first and the second absorbing axes of the polarizers.

Figure 5:
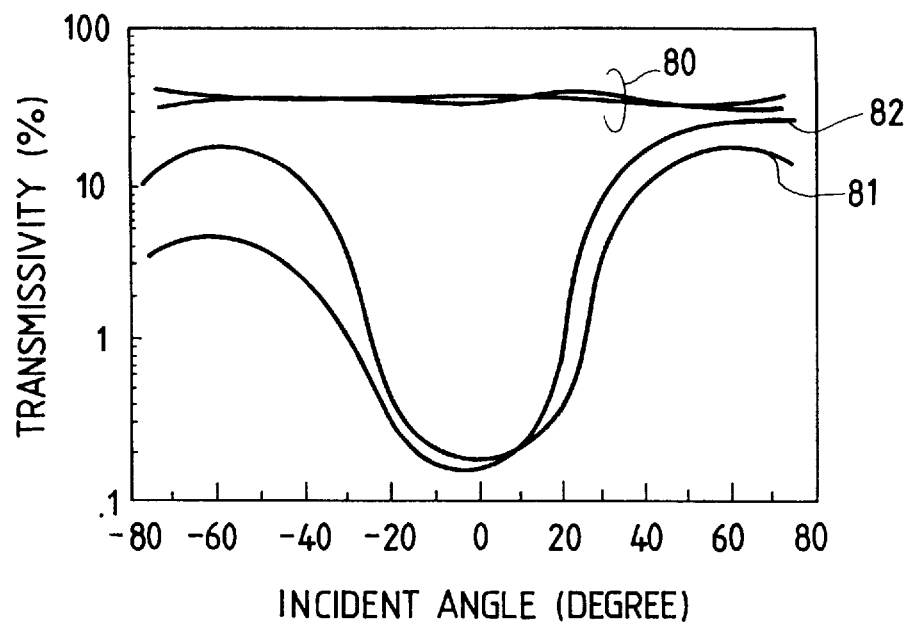
FIG. 5 is a graph indicating the visible angular dependence of the liquid crystal display part 30 manufactured in the configuration shown in FIG. 4.

FIG. 5 is a graph indicating angular dependence of the liquid crystal display part 30 manufactured with the relationship shown in FIG. 4. In the case of this embodiment, the twist angle 64 was selected to be 90 degrees. The crossing angle of the absorbing axis 60 of the first polarizer and an absorbing axis 61 of the second polarizer was selected to be approximately a right angle. The liquid crystal display part 30 has a value of 0.55 $\mu$m for the retardation, $\Delta$nd, of the liquid crystal layer. The angular dependence, which is one of transmission characteristics of the liquid crystal display part 30, is shown in FIG. 5. The abscissa indicates the incident angle (degrees) to the normal line of the liquid crystal display part 30. The ordinate indicates transmissivity (%) of light through the liquid crystal display part 30. The characteristic curves 80 indicate the angular dependence in both vertical and lateral directions in a non-voltage state applied for transmitting light, that is, to produce a bright display. The two curves are almost in overlapping relationship to each other. The positive incident angle indicates upper and left directions, and the negative incident angle indicates bottom and right directions. The upper and bottom, and the right and left directions in FIG. 5 indicate the directions at the liquid crystal display part 30 postulated in FIG. 4.

The characteristic curve 81 indicates the angular dependence in the right to left direction in the voltage applied for shielding light, that is, to produce a dark display, and the positive angle indicates the left direction, while the negative angle indicates the right direction. The characteristic curve 82 indicates the angular dependence in the top to bottom direction in the dark display, and the positive angle indicates the top direction, while the negative angle indicates the bottom direction.

FIG. 5 reveals that the light has a large transmissivity irrespective of whether a voltage is applied (shield) or is not applied (transparent) in a region of large incident angles (defined as approximately outside the normal line direction) regardless of whether the values are positive or negative, which region is separated from a region of the normal line direction (defined as approximately a normal line direction) of the liquid crystal display part 30. In other words, FIG. 5 indicates that the liquid crystal display part 30 has a transmitting characteristics wherein external light from a designated direction other than the normal line direction, that is, the light from an oblique direction having a large incident angle, is not shielded even in an external light shielding condition. In case of the present embodiment, the transmissivity of the top direction and the horizontal direction are especially large. In obtaining the above described characteristics, the crossing angle of the absorbing axis 60 and the absorbing axis 61 of the second polarizer is not necessarily required to be exactly a right angle, accordingly, it is defined as approximately a right angle.

Based on results from manufacturing and investigation of various kinds of the liquid crystal display part 30, it was revealed that, in order to increase transmissivity of light from the oblique angle regardless of whether the voltage is applied or not applied, the retardation, Δnd, of the liquid crystal layer is preferably more than at least 0.35 μm when the twist angle 64 is equal to or less than 90 degrees, and more than at least 0.45 μm when the twist angle 64 is in a range from 200 degrees to 270 degrees. Further, it was revealed that the increasing ratio in transmissivity in a bright display condition, that is in a non-voltage applied condition, is generally less than the increasing ratio in a dark display condition regardless of varying the arrangement shown in FIG. 4 and the retardation, Δnd.

In evaluating results of the embodiment of the present invention, a typical office environment where the reflective liquid crystal display apparatus is practically used was examined, and a typical office environment including typical use conditions and typical illuminance conditions was determined. First, the typical use conditions will be explained.

Figure 6:
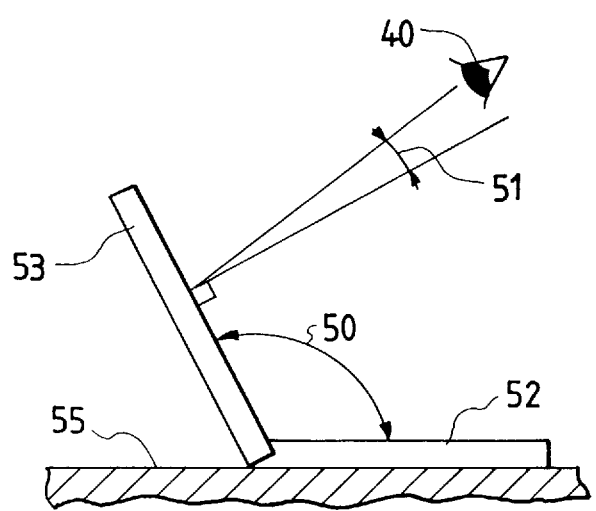
FIG. 6 a diagram indicating the disposition in the operating condition of the display apparatus in the embodiment of FIG. 1.

FIG. 6 is an illustration indicating the disposition in operating condition of the display apparatus in this embodiment. The operating condition of the display apparatus was examined for 20 users to determine the most preferably usable angle of the display plane and an angle toward the viewer. The method used in the above examination included the following steps. First, the display part 53 and the processing part 52 were set on a desk 55, as shown in FIG. 6, adjusted to the most preferable use condition, and then the setting angle 50 of the display plane and direction at eye position of the user to the normal line of the display part 53 (liquid crystal display part 30), that is, the viewer's angle 51, which is an angle toward the viewer 40, were determined. As a result, the preferable setting angle 50 was determined to be in a range of 110 degrees ±20 degrees, and the viewer's angle 51 was determined to be in a range of 0 degree ±20 degrees.

The viewer's angle of 0 degree means that the line in sight of the viewer 40 is in a similar direction to the normal line of the display part 53. Accordingly, the previously defined approximately normal line direction can be said to be in a range of 0 degree ±20 degrees. And, the peak of the reflected light from the display part 53, that is, the directivity of the display characteristics of the liquid crystal display part is preferably directed toward the viewer 40 within the range of 0 degree ±20 degrees of the viewer's angle.

According to the above examination, a typical use condition of the display plane was determined for the setting angle 50 to be 120 degrees and for the viewer's angle 51 to be 0 degree.

Next, the typical illuminance condition will be explained. First, the illuminance at the display part 53 in the typical office environment was examined. The method used in the above examination was as follows. The user sat in front of the display part 53, as shown in FIG. 6, and illuminance at the display plane of the liquid crystal display part 30 was determined at various angles taken as a parameter, as shown in FIGS. 7(*a*), 8(*a*) and 9(*a*). The results determined in the several environments are indicated in FIGS. 7(*b*), 8(*b*), and 9(*b*).

FIGS. 7(*b*) and 8(*b*) indicate the illuminance distribution in the perpendicular (normal) direction to the display part 53. It was revealed that the distribution can be divided into two categories, as shown in FIG. 7 and FIG. 8. The illuminance taken at angles in the middle portion 14 of the display part 53 as a parameter was determined at positions from the top to the horizontal direction at an interval of every 22.5 degrees'. In the illuminance distribution shown in FIG. 7(*a*), illuminance at the overhead position was 750 lux (1x), at lowered positions in order were 580 lux, 480 lux, at a position in a direction toward the shadow of the user was 280 lux, and 170 lux at a position in the horizontal direction. The above distribution of the illuminance is indicated by the direction and length of the arrows in the arrow illuminance distribution 15 in the respective FIGS. 7(*a*), 8(*b*), and 9(*b*).

In the other illuminance distribution shown in FIG. 8(*a*), illuminance at the overhead position was 700 lux (1x), and the maximum illuminance 1000 lux was obtained at a position displaced by 22.5 degrees from the overhead position. At a further displaced position, 600 lux was obtained, and the illuminance decreased rapidly in a direction toward the shadow of the user to 400 lux. At a position in the horizontal direction, the illuminance was 210 lux. The arrow illuminance distribution 15 is as shown in FIG. 8(*b*). In the determination, the setting angle 50 was constant at 120 degrees.

Figure 9A:
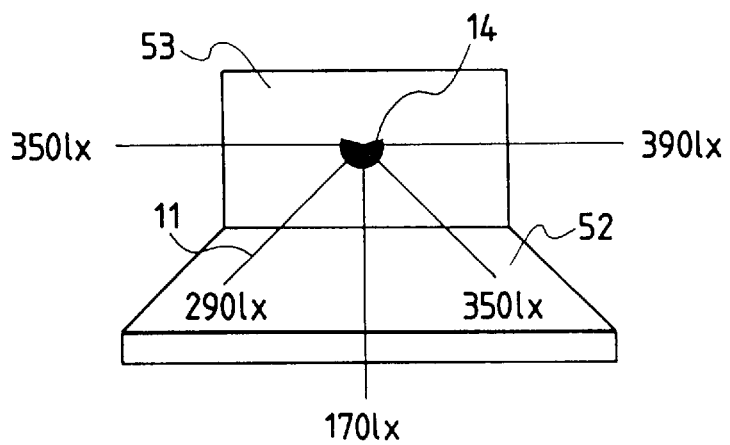
FIGS. 9(a) and 9(b) are diagrams indicating the distribution of illuminance in a direction lateral to the display part 53.
Figure 9B:
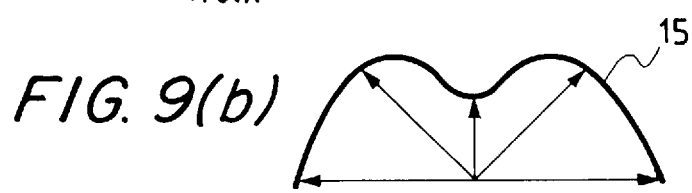

FIG. 9(*a*) indicates the distribution of illuminance in the horizontal direction (right and left) with respect to the display part 53. As shown in FIG. 9(*a*), the illuminance distribution was determined in the horizontal direction to the processing part 52. In the result, illuminance in directions to both sides was 350 lux and 390 lux, and in 45 degrees direction was 290 lux and 350 lux, respectively. In the front direction, which is in the shadow of the user, the illuminance was 170 lux. The arrow illuminance distribution 15 at the middle 14 of the display plane is as shown in FIG. 9(*b*). That is, the illuminance decreases rapidly in the front direction, which is in the shadow of the user.

Based on the above examination, the typical illuminance condition at the display plane was set in the illuminance distribution in a vertical direction, which has a maximum value in the overhead direction, and the illuminance distribution in the horizontal direction, as shown in FIG. 9(*b*). Accordingly, the typical office environment condition has incident external light from the overhead direction, a setting angle of 120 degrees, and a viewing direction which is along the normal line direction to the display plane. The incident external light from the overhead direction has an incident angle of 60 degrees to the normal line direction to the display part 53.

Further, based on the above examination, it was revealed that a display apparatus having functions to transmit the light incident from overhead within a range of ±20 degrees effectively, and to reflect the light toward the direction of the viewer's angle 51 of 0 degree ±20 degrees is preferable. Therefore, it is important to satisfy the above conditions in order to obtain a bright reflective liquid crystal display apparatus.

In the present embodiment, a nematic liquid crystal was used for the liquid crystal layer 22, but other liquid crystals, such as a super twisted nematic liquid crystal (STN), homogeneous liquid crystal, and homeotropic liquid crystal, can be used. The above liquid crystal layers and the polarizers are integrated into a combination described above, and the liquid crystal display part 30 having angular dependence characteristics as shown in FIG. 5 is manufactured. The liquid crystal display part 30 has angular dependence characteristics with a large angle dependence, as shown in FIG. 5, that is, the directivity of the transmission is preferable as the liquid crystal display means for the reflective liquid crystal display apparatus, because especially the above display part 30 can transmit light from the overhead direction effectively to the reflector.

Referring to FIG. 1, the operation of the liquid crystal display part 30 as a liquid crystal display means and the operation of the blaze reflector 23 as a reflecting means in the display part 53 of the embodiment 1 will be explained hereinafter.

As shown in FIG. 1, the incident light 11 is projected onto the liquid crystal display part 30, wherein the setting angle 50 of the display part 53 is set at 120 degrees, as external light in a designated direction from the overhead direction. The incident angle to the liquid crystal display part 30 is 60 degrees. The liquid crystal part 30 has an angular dependence characteristic having a high transmissivity regardless of whether bright display or dark display is produced, as shown in FIG. 5. Accordingly, the incident light 11, representing a large quantity of light from the overhead direction, is transmitted through the liquid crystal display part 30 regardless of whether there is a bright display or a dark display. Subsequently, the transmitted incident light 11, representing a large quantity of light, is reflected by the blaze reflector 23 operating as a reflecting means to produce reflected light 12.

If the reflecting means is merely a mirror plane, the light 12 is reflected in a direction of 60 degrees to the normal line, and is not reflected along the normal line direction (the direction of viewer's angle 0 degree), i.e. toward the viewer. Accordingly, bright display characteristics can not be obtained with use of a plane mirror reflector.

Therefore, the incident light 11 must be reflected by the blaze reflector 23 having a blaze angle of 20 degrees in order to reflect the reflected light 12 in the normal line direction, i.e. toward the viewer 40.

That means that the blaze reflector 23 operates as a reflection means for reflecting external light transmitted through the liquid crystal display part 30, operating as the liquid crystal display means, in an approximately normal line direction. In the manner described above, the reflected light 12 is transmitted through the liquid crystal display part 30 again. At that time, the radiated angle of the reflected light is 0 degree. Accordingly, the liquid crystal display part 30 clearly displays a transmission (bright) condition and a shield (dark) condition depending on the transmission characteristics in an approximately normal line direction. That means that bright display characteristics can be obtained because the reflected light 12, representing a large quantity of light, makes a bright display when the light transmits and a dark display when the light is shielded, i.e. depending on the state of the LC.

Here, the refractive index of the matching agent has a refractive light of 10 degrees, and if the parts separated by an air layer, which does not use the matching agent, the blaze angle should be 30 degrees.

The brightness characteristics of the display part 53 using the liquid crystal display part 30 and the blaze reflector 23 in the embodiment were determined in accordance with the foregoing discussion of a typical office environment. As a result, the display part 53 has reflected light distribution characteristics having a directivity approximately in the direction of the viewer 40 as a center with a half value width of 30 degrees. The half value width refers to a point having a half value of the peak quantity of light expressed by an angle from the point indicating the peak value.

And, a contrast ratio between the bright display and the dark display which is equal to or more than 50 could be obtained. The value was more than 2 times the conventional contrast ratio.

Further, as a result of the blaze plane of the blaze reflector 23 being roughened to cause scattering reflection in order to prevent the reflection from being a specular reflection, so as to provide a diffused reflection in a range approximately 20% to 30% Lambertion, it was revealed that a preferable directivity could be obtained without depleting image quality due to glare caused by interference.

Further, when the color filters 33 in the reflective colored liquid crystal display apparatus in the embodiment were eliminated and the apparatus was used as a monochrome liquid crystal display apparatus, a bright display could be obtained. The contrast ratio of the bright display and the dark display at that time was also higher than 50.

Further, when using a display apparatus having 100 pixels (10×10), each of the pixels being 300 μm×300 μm in size, in the same composed condition as the above for displaying bright and dark conditions per the pixel, the brightness of the bright display hardly decreased in comparison with a total bright display.

Figure 10A:
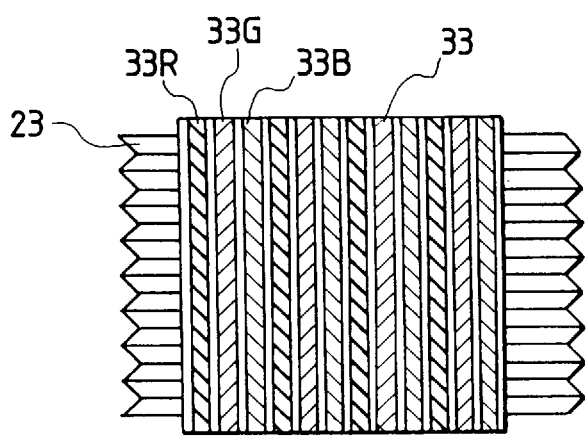
FIGS. 10 (a) and 10(b) are diagrams indicating an arrangement of the respective color stripes in the color filters 33 shown in FIG. 1.

FIGS. 10(*a*) and 10(*b*) are illustrations indicating an arrangement of the respective color filters in the color filters 33 shown in FIG. 1. FIG. 10(*a*) is a partial enlarged illustration of the color filter 33 and the blaze reflector 23. FIG. 10(*b*) is a perspective view of the FIG. 10(*a*).

As shown in FIGS. 10(*a*) and (*b*), stripe filters of each of the primary colors, comprising red filters 33R, green filters 33G, and blue filters 33B, are arranged respectively in the color filter 33 so that the stripe direction of the color filter crosses the blaze groove direction of the blaze reflector 23 by approximately a right angle.

Figure 10B:
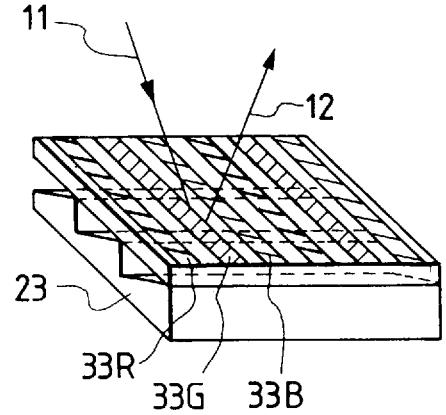

The blaze groove direction of the blaze reflector 23 is parallel to the horizontal direction of the display part 53. Accordingly, the stripe direction of the color filter 33 is vertical, i.e. perpendicular to the blaze groove direction of the display part 53. And, as stated previously, both the incident light 11 and the reflected light 12 are directed perpendicular to the display part 53. Therefore, the stripe direction of the color filter 33 and the direction of the plane containing tracks of the incident light 11 and the reflected light 12 are in a parallel relationship. That is, as shown in FIG. 10(b), for instance, if the incident light 11 from the overhead direction passes through the blue filter 33B, the reflected light 12 reflected from the blaze reflector 23 toward the viewer 40 also passes through the blue filter 33B.

In other words, in the reflective display apparatus, if the stripe direction of the stripe filter is arranged in parallel to the plane containing tracks of the external incident light 11 and the reflected light 12, which are projected and reflected by the reflection means, the incident light and the reflected light pass through filters of the same color. Therefore, even if the red filter is a color filter having a function to transmit only red and to absorb every other color, the incident light and the reflected light do not pass through the filters of the other colors, and consequently, a loss of light can be decreased. The above feature can be said to provide a typical advantage for the reflective display apparatus, because the transmission display apparatus does not use reflection.

Figure 11:
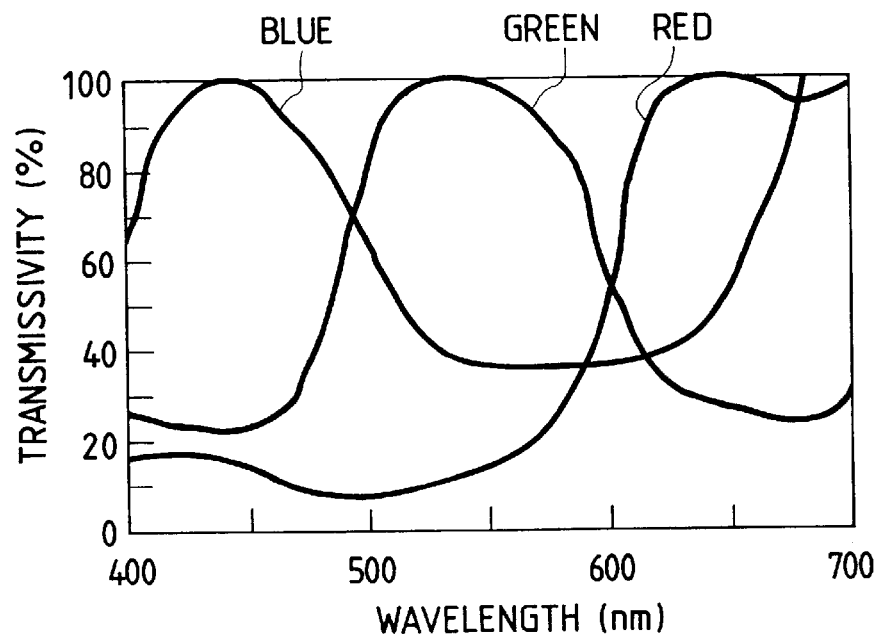
FIG. 11 is a graph indicating the transmissivity characteristics of respective colors of the color filters 33.

FIG. 11 is a graph indicating transmissivity characteristics of respective colors of the color filters 33. The transmissivity of the color filter 33 used in the embodiment is higher in all wavelength regions, as shown in FIG. 11, than conventional transmissive color filters. As for transmissivity of the transmissive color filter, for instance, a blue filter is desired to have a low transmissivity in the wavelength of the green and red regions. However, in a case of a reflective color filter, the color filter is desired to have high transmissivity in order to not absorb light, because the light passes through the filter of the same color twice, as stated previously. For instance, in the blue filter characteristics of the reflective color filter, transmissivity in a wavelength region over 550 nm is increased to about 40% from approximately 0% for the conventional filter.

Further, in order to obtain a bright reflective color liquid crystal display apparatus, color filters for colors such as cyan, magenta, and yellow, rather than red, blue, and green, can be used, although the display color range will be narrow.

Furthermore, the color filter 33 used in the embodiment can be improved.

Figure 12:
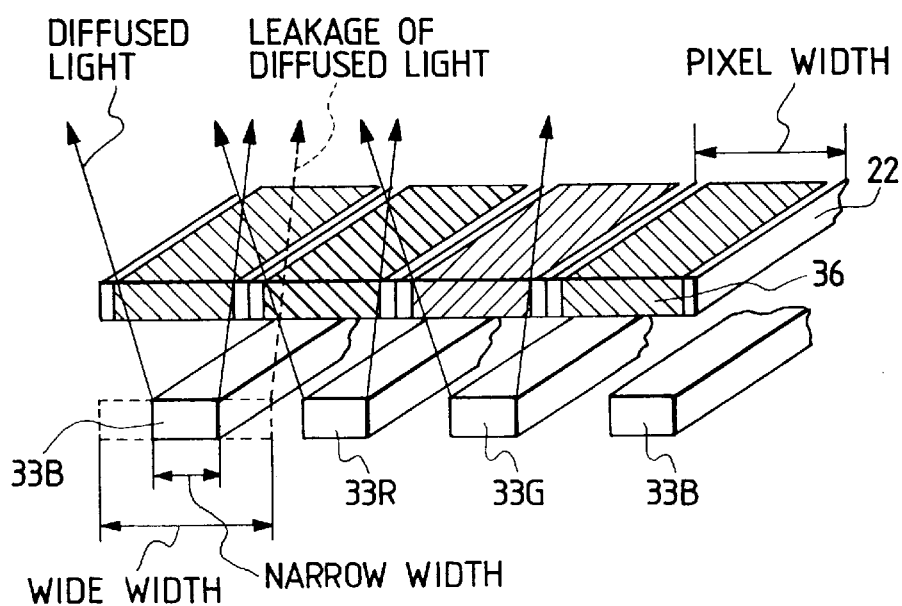
FIG. 12 is a detail view partly in cross section indicating a relationship among the stripe width of the stripe filter, the pixel width of the liquid crystal layer 22, and the aperture part 36.

FIG. 12 is a cross section indicating a relationship among the stripe width of the stripe filter, the pixel width of the liquid crystal layer 22, and the aperture part 36. As shown in FIG. 12, the width of each stripe of the stripe filter was made narrower than the width of a pixel in the liquid layer 22 in a direction perpendicular to the stripe direction. In the embodiment, the width of a stripe was made to be 50% of the pixel width (300 $\mu$m). An ideal size of the aperture part 36 of the liquid crystal layer 22 is same size as the pixel width. As a result, the brightness was increased in comparison with a case where the stripe width is same as the pixel width. When the stripe width is the same as the pixel width, as shown in FIG. 12 by dotted lines, a part of the diffused light transmitted through the blue filter 33B is leaked to an adjacent pixel for the red display, and this produces an undesirable influence. Therefore, the stripe width of the stripe filter desirably is narrower than the pixel width of the liquid crystal layer 22 in a direction perpendicular to the stripe direction.

Next, a first comparative example to be compared with the embodiment of the invention for confirming the advantages of the invention will be explained hereinafter.

The composition of the first comparative example is the same as the embodiment shown in FIG. 4 except for using a liquid crystal display part 30 wherein the angle of the cross section of the absorbing axis 60 of the first polarizer and the absorbing axis 61 of the second polarizer was selected to be 0 degree, that is, the two absorbing axes are arranged in parallel. The twist angle was the same, i.e. 90 degrees.

Figure 13:
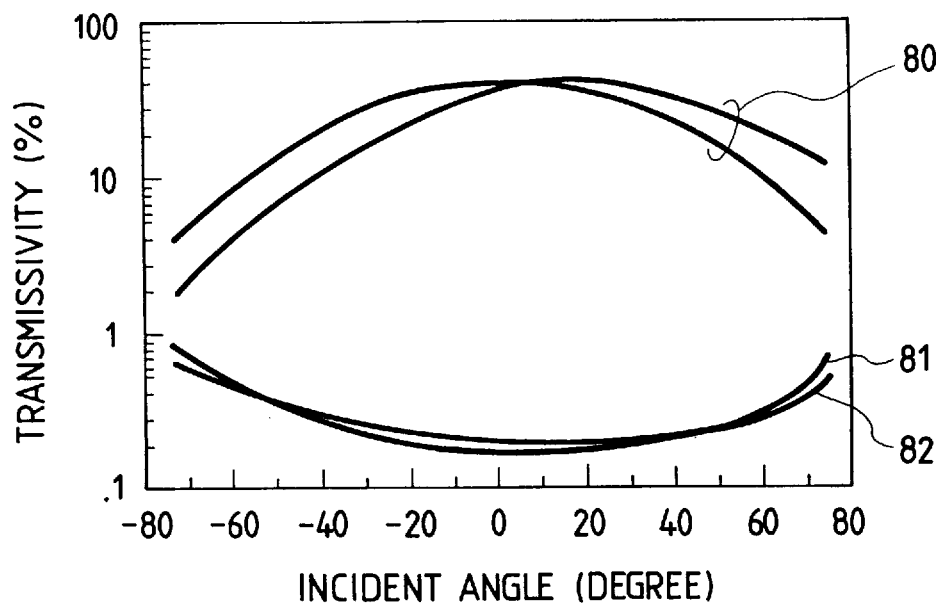
FIG. 13 is a graph indicating the angular dependence of the liquid crystal display part 30 manufactured in the configuration shown in one comparative example.

FIG. 13 is a graph indicating the angular dependence of the liquid crystal display part 30 manufactured in the configuration of the comparative example. The angular dependence is indicated in the same manner as in FIG. 5. That is, the abscissa indicates the incident angle to the liquid crystal display part 30, and the ordinate indicates, transmissivity (%) of light. The two characteristic curves 80 indicate the angular dependence in the vertical and the lateral directions in a non-voltage applied state, the characteristic curve 81 indicates the angular dependence in the lateral direction in a voltage applied state, and the characteristic curve 82 indicates the angular dependence in the vertical direction in a voltage applied state, respectively.

When using a display apparatus having 100 pixels (10× 10), each of the pixels being 300 $\mu$m×300 $\mu$m in size, in the first comparative example of which the display mode is shown in FIG. 13 for displaying bright and dark states per pixel, the brightness of the bright display decreased significantly in comparison with the embodiment of the invention.

The composition of a second comparative example is the same as the embodiment of the invention except for the stripe direction of the color filter 33 being arranged in parallel to the blaze groove direction of the blaze reflector 23.

In the second comparative example, the brightness of the bright display decreased significantly in comparison with the embodiment of the invention.

The composition of a third comparative example is the same as the embodiment of the invention except for the fact that the matching agent 32 is not used, but only an air layer is used.

As a result of the display part 53 in the third comparative example being examined under the typical office environment, it was revealed that both the brightness of the bright display and the contrast ratio decreased significantly in comparison with the embodiment of the invention.

Figure 14:
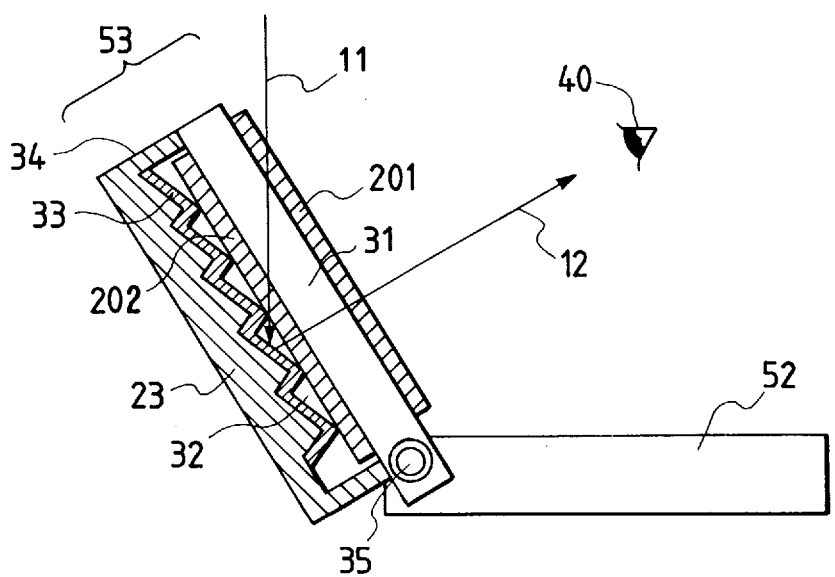
FIG. 14 is a side view partially in cross section illustrating the composition of the reflective color liquid crystal display apparatus forming another embodiment of the present invention.
Figure 15:
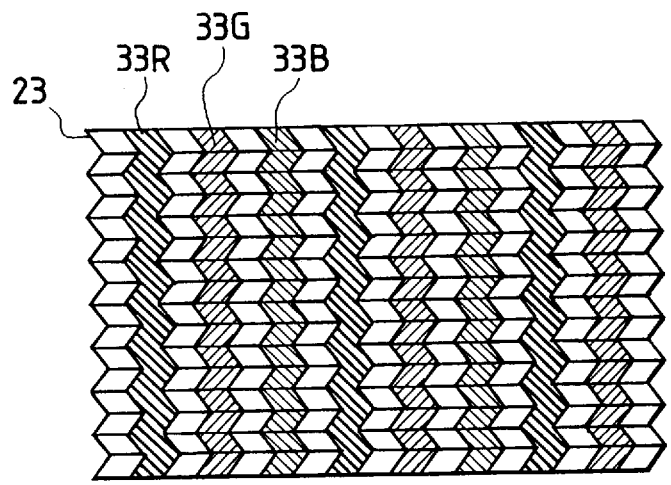
FIG. 15 is a partially enlarged view of the color filter 33 and the blaze reflector 23 shown in FIG. 14.

FIG. 14 is a partial cross section indicating the composition of a reflective color liquid crystal display apparatus in accordance with the present invention, and FIG. 15 is a partially enlarged view of the color filter 33 and the blaze reflector 23 shown in FIG. 14. As shown in FIGS. 14 and 15, the composition of the apparatus is the same as the embodiment of FIG. 1, except only for the arrangement of the color filter 33.

As shown in FIG. 15, the color filter 33 is arranged in contact tightly on the reflection plane of the blaze reflector 23 so that the stripe filters cross with the blaze grooves in an approximately right angle. For instance, the stripe filter is printed directly onto the reflecting means. The purpose of contacting the stripe filter tightly onto the reflector is in order to make the incident light 11 be projected and the reflected light 12 be reflected through the same point in the color filter 33 provided on the reflector for transmitting the color filter 33 of the same color. As the color filter 33 is arranged in contact on the reflector tightly as a thin film, the lights are projected onto and reflected from approximately the same point of the color filter. Therefore, the absorption of light passing through the color filter of another color can be avoided.

Although a stripe color filter was used in this modified arrangement, a general dot filter may be used in the same manner so long as light is projected onto and reflected from the same point, and consequently, the shape of the color filter is not restricted if a thin film filter is arranged in contact tightly with the reflecting plane.

Although a transmissive color filter was printed in the modified arrangement, a reflective color filter could be used, alternatively. The reflective color filter is thinner than the transmissive color filter and is thought to be preferable with a view toward providing the same point of projection and reflection. The transmissive filter has a designated film thickness, for instance, a red filter transmits only the color red and absorbs all other colors. On the contrary, the reflective filter is a thin film, and a green filter reflects only the green color and absorbs all other colors.

As a result of determining the brightness produced by the embodiment of FIG. 14, display characteristics equal to the embodiment of FIG. 1 were obtained.

Figure 16:
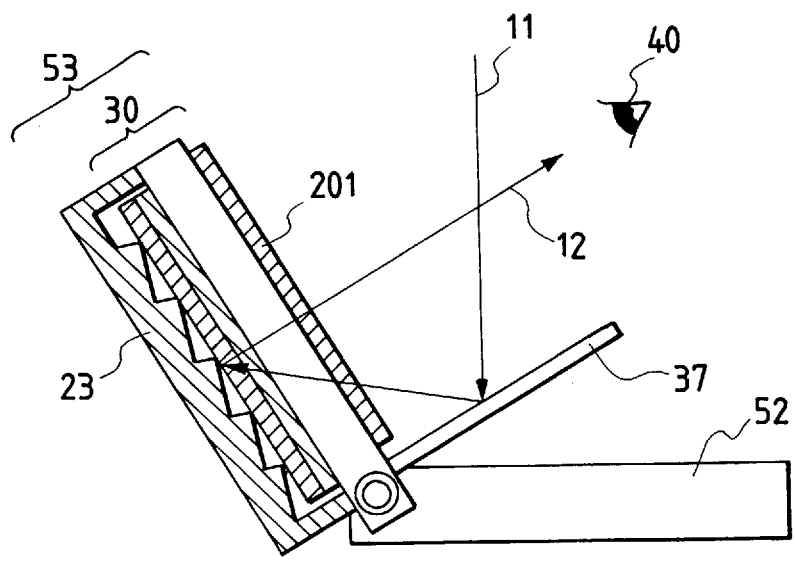
FIG. 16 is a side view partially in cross section illustrating the composition of a reflective color liquid crystal display apparatus forming a further embodiment of the present invention.

FIG. 16 is a partial cross section indicating the composition of a reflective color liquid crystal display apparatus forming another embodiment of the present invention. This embodiment of the display apparatus does not have any reflected image from the overhead direction. The composition of the embodiment of FIG. 16 is the same as the embodiment of FIG. 1 except for the fact that the declining direction of the blaze plane in the blaze reflector 23 is made reverse to the declining direction in the embodiment of FIG. 1, and a diffused reflector 37 is arranged as an indirect projection means at a lower part of the display part 53 in an approximately perpendicular direction to the display plane. Alternatively, an arrangement wherein the arrangement of FIG. 14 and the embodiment of FIG. 16 are combined together can be used.

The composition of the embodiment of FIG. 16 will be explained in detail hereinafter. The reflecting plane of the blaze reflector 23 was made to be a specular plane, and the first polarizer 201 at the display plane side was not processed with a surface treatment, such as a non-glare treatment. The blaze angle 24 of the blaze reflector 23 was 20 degrees, and the pitch of the grating was irregular in pitch in a range of 30–70 μm.

In this embodiment, the diffused reflector 37, operating as an indirect projection means, reflects the incident light 11, which is an external light having a large quantity of light received from the overhead direction, and projects the light indirectly onto the liquid crystal display part 30, operating as a liquid crystal display means. The incident light 11 reflected by the diffused reflector 37 becomes diffused light, and passes through the liquid crystal display part 30; and, subsequently, the light is reflected toward the viewer 40 by the specular plane of the blaze reflector 23. In accordance with the arrangement of the diffused reflector 37 as described above, the reflecting plane of the blaze reflector 23 can be made a specular plane, and reflectance is increased and a bright display can be obtained.

The brightness characteristics of the display part 53 of the embodiment were determined in a typical office environment. As a result, reflected light distribution characteristics having a directivity approximately toward the viewer 40 as a center with a half value width of 30 degrees were obtained, and there was no reflected image. The brightness of the reflected light at the time indicated the same bright display characteristics as that of the embodiment of FIG. 1. Further, as the reflected light from the diffused reflector 37 is diffused light, glare by interference was not generated even if the reflecting plane of the blaze reflector 23 was a specular plane. The color filter 33 can be formed by printing directly on the reflector, and the brightness can be increased further by making the stripe width thinner than the pixel width.

Figure 17:
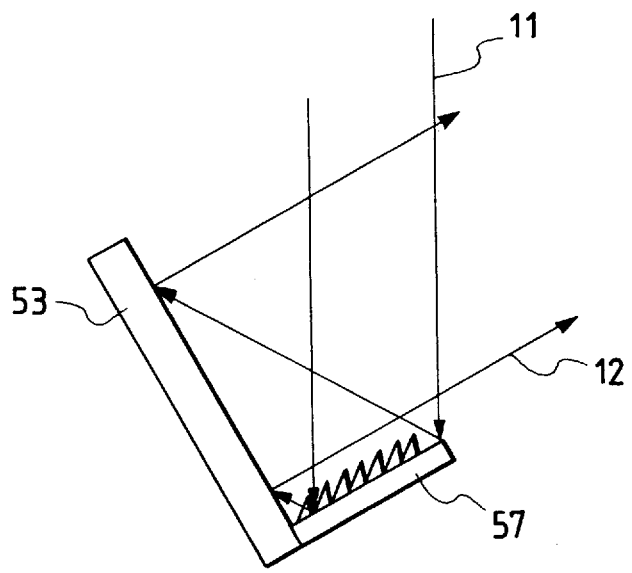
FIG. 17 is a side view showing another form of the diffused reflector 37 shown in FIG. 16.

FIG. 17 is a side view showing another form of the diffused reflector 37 shown in FIG. 16. Instead of the diffused reflector 37, a blaze diffused reflector 57 is arranged as an indirect projection means. In this case, the incident light 11 from the overhead direction is collected by the blaze diffused reflector 57 having a directivity in addition to diffusivity, and consequently, an advantage such as obtaining bright images in the display part 53 is realized.

Figure 18:
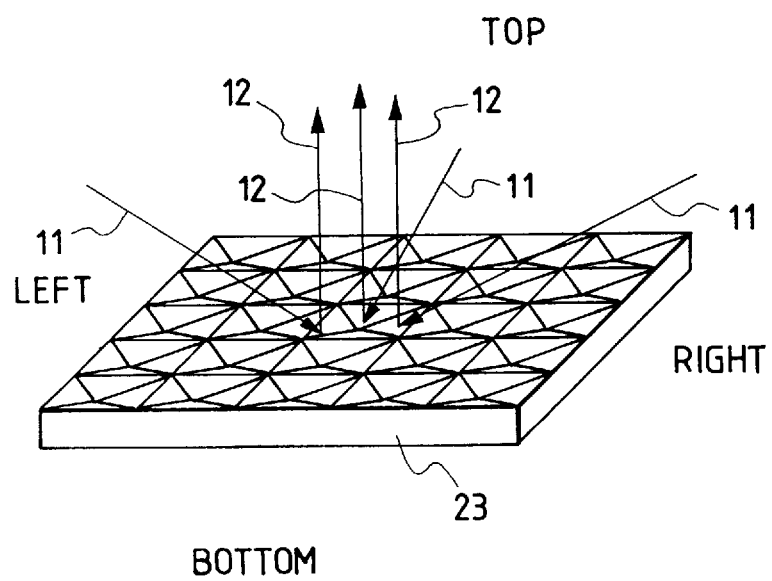
FIG. 18 is a perspective view illustrating another form of the blaze reflector 23 of the reflective color liquid crystal display apparatus of the present invention.

FIG. 18 is an perspective view of an improved blaze reflector 23 for a reflective color liquid crystal display apparatus. FIGS. 19(a) and 19(b) are partial enlarged cross sectional views of the reflector of FIG. 18. FIG. 19(a) is a lateral cross section of FIG. 18, and FIG. 19(b) is a vertical cross section of FIG. 18.

The general configuration of this reflector is the same as the embodiment of FIG. 1 except for the fact that three kinds of declined blaze planes are used in the blaze reflector 23, and the color filter 33 is arranged directly onto the blaze reflector 23. Alternatively, this blaze reflector 23 can be used in combination with the arrangement of FIG. 14 or the embodiment of FIG. 16.

In the previously described embodiments, the incident light 11 from overhead direction is guided effectively toward the viewer 40. On the contrary, the reflector of FIG. 18 is designed for collecting light received from the lateral direction in addition to light received from the overhead direction, and for guiding the collected light effectively toward the viewer 40 of the liquid crystal display part 30.

As the cross section shown in FIG. 19(a) indicates, the blaze plane has two kinds of declined planes laterally in order to reflect light from a lateral direction toward the viewer 40, and the surface of the declined plane has a convex shape. Each of the blaze angles 24 of the declined planes facing to the right and facing to the left can be set independently.

As the cross section shown in FIG. 19(b) indicates, the blaze plane for reflecting the light from the overhead direction toward the viewer 40 has only one kind of declined plane angled regularly to one side to the same extent as the declined plane in the embodiment of FIG. 1.

In this reflector, the pitch of the grating in both the longitudinal and the lateral directions was 30 μm, the blaze angle toward the overhead direction 24 was 20 degrees, and the blaze angle in the lateral direction was 20 degrees, respectively.

The brightness characteristics of the display part 53 using the arrangement of FIG. 18 were determined in the typical office environment. As a result, reflected light distribution characteristics having a directivity approximately toward the viewer 40 as a center with a half value width of 30 degrees were obtained. Although the directivity in the lateral direction in the previous embodiments was small, the reflected light distribution characteristics in the lateral direction with the arrangement of FIG. 18 had the directivity of a half value width of 30 degrees. And, display characteristics, wherein the brightness of the reflected light was brighter by more than 1.5 times of the embodiment of FIG. 1, were obtained.

Further, it was confirmed that the directivity is improved and deterioration of image quality, such as by glare due to interference, was not generated by making the reflected light have a scattering property by processing the surface of the reflecting plane of the blaze reflector 23 to have a diffused reflection by approximately 20%–30% Lambertion.

On the other hand, the illuminance distribution at the display part 53 in the typical office environment can be separated roughly into two categories, as stated previously referring to FIGS. 7(a) and 8(a). Accordingly, even if two kinds of declined plane are used for the blaze plane in the blaze reflector 23, the declined planes do not cause any problem. For instance, assuming that the blaze angles 24 in a declined plane are set at 20 degrees and 5 degrees; and, as seen in FIG. 19(a), two kinds of convex shapes are formed alternately, and, in FIG. 19(b), the two kinds of declined planes, i.e. 20 degrees and 5 degrees, are set alternately in the blaze reflector. By composing the reflector as described above, light from either direction can be reflected and collected, and consequently, a bright display can be realized. That means that a bright display in any office environment can be obtained by providing the blaze plane of the blaze reflector with plural kinds of declined planes.

In accordance with the invention, the setting angle 50 may be changed, and the display part 53 may be used in a horizontally disposed position, for instance, such as in the case of palm top computers and electronic notebooks.

FIG. 20 is a partial cross section indicating the composition of a reflective color liquid crystal display apparatus using this concept of the present invention. In FIG. 20, the setting angle 50 of the display part 53 is approximately 180 degrees, that is, the display part 53 is disposed generally horizontally.

The composition of the reflector used in the above condition is achieved when the blaze reflector 23 of the display part 53 in the embodiment of FIG. 1 is replaced by a blaze reflector 23 having a blaze angle 24 of 15 degrees, and wherein the pitch of the grating is 30 μm.

As a result, the incident light 11 on the display part 53 (blaze reflector 23) from the overhead direction was reflected by the 15 degree blaze angle to form the reflected light 12 in the 30 degree direction to the normal line direction, because the display part is disposed substantially horizontally. That is, the blaze angle 24 of the blaze reflector 23 is set to a designated angle in order to project the reflected light 12 toward the viewer 40.

And, preferable display characteristics having improved directivity and no glare generated by interference were obtained by making the surface of the reflection plane of the blaze reflector 23 have a scattering property with approximately 20%–30% Lambertion.

The brightness characteristics of the display part 53 using the arrangement of FIG. 20 was determined in the typical office environment. As a result, reflected light distribution characteristics having a directivity approximately toward the viewer 40 as a center with a half value width of 30 degrees were obtained. And, a contrast ratio of the bright display and the dark display of over a level 30 was obtained.

When using a display apparatus having 100 pixels (10× 10), each of the pixels having 300 μm×300 μm width, for displaying bright and dark states per pixel, the brightness of the bright display was hardly decreased.

However, the contrast ratio was somewhat lower than the other embodiments as described previously, although an improvement was realized by using the arrangement of FIG. 20. The low contrast ratio is caused by oblique deviation of the viewer 40 from the normal line direction of the liquid crystal display part 30 because the display part 53 is disposed horizontally. Therefore, the peak of the contrast ratio must be shifted toward a lower oblique angle so that the contrast ratio becomes largest toward the viewer 40.

Therefore, a liquid crystal display part 30 having twist angle 64 of 60 degrees, which was formed by crossing the rubbing direction 62 of the first alignment layer and the rubbing direction 63 of the second alignment layer, as explained in connection with FIG. 4, was manufactured. As a result, the peak of the contrast ratio was shifted in the lower oblique direction toward the viewer 40, and the contrast ratio toward the viewer 40 was improved to over level 50.

In accordance with the above result, it is revealed that the most preferable contrast ratio toward the viewer 40 can be obtained by effecting coincidence between a direction where the contrast ratio becomes peak and a line toward the viewer 40 by setting the twist angle 64 at a designated value, and concurrently, that the blaze angle 24 of the blaze reflector 23 can be set so as to project the reflected light 12 toward the viewer 40. That is, the liquid crystal display part 30 operating as a liquid crystal display means has a designated twist angle for effecting coincidence between the direction of the viewer and the direction where the contrast ratio becomes peak. And, the blaze reflector 23, operating as a reflecting means, reflects the external light which has transmitted through the liquid crystal display part 30 toward the viewer.

The contrast ratio was adjusted by changing the twist angle, but the contrast could be changed by using a retardation film.

Figure 21:
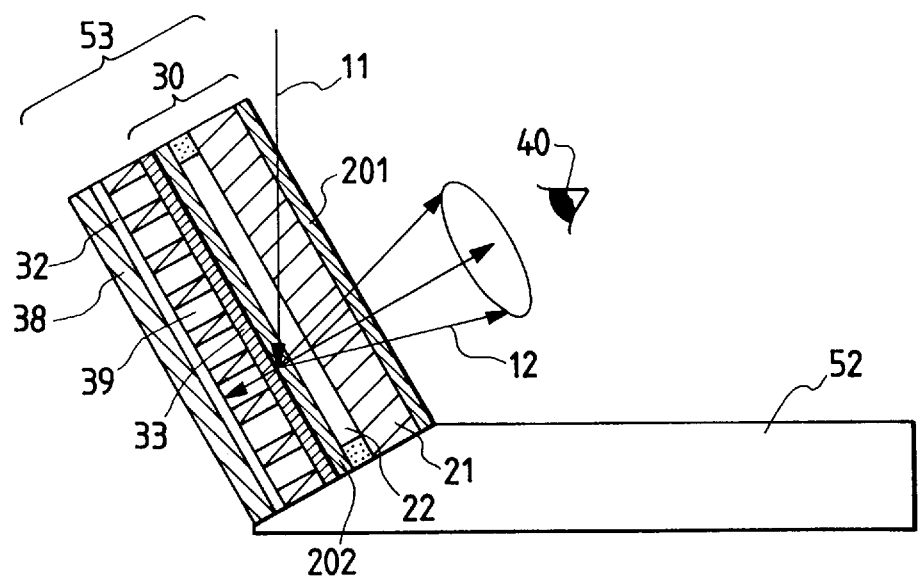
FIG. 21 is a side view partially in cross section illustrating the composition of a reflective color liquid crystal display apparatus a still further embodiment of the present invention.

FIG. 21 is a side view partially in cross section indicating the composition of a reflective color liquid crystal display apparatus in accordance with the present invention. The present embodiment involves another reflecting means of the present invention. The composition of the embodiment can be separated roughly into two parts, a display part 53 and a processing part 52. The display part 53 comprises a liquid crystal display means and a reflecting means.

The liquid crystal display part 30, operating as liquid crystal display means, comprises at least a first polarizer 201, a substrate 21, a liquid crystal layer 22, a second polarizer 202, and a color filter 33. The reflecting means comprises at least a fiber optic face plate 39, operating as light guide means, and a specular reflector 38 operating as a reflector.

The composition of the embodiment of FIG. 21 will be explained in more detail hereinafter.

The liquid crystal layer 22 formed of a nematic liquid crystal, the second polarizer 202, and the color filter 33 are arranged between one transparent substrate 21 and the fiber optic face plate 39 comprising another substrate, and the first polarizer 201 is arranged at the display plane side of the liquid crystal layer 22. The second polarizer 202 is arranged at the other display plane side of the liquid crystal layer 22 in order to correct disruption of the polarizing condition of the light which passes through the fiber optic face plate 39.

In the present embodiment, a fiber optic face plate of NA (numerical aperture) 0.5 is used as a light guide means for guiding the light in a designated direction, in this case, in the thickness direction of the display part 53. As a reflector for reflecting the light from the light guide means to return to the light guide means, generally a conventional specular reflector 38 is used. The color filter 33 is arranged at the display plane side of the fiber optic face plate 39. The color filter can also be arranged at the reverse side of the above side. Other elements are the same as in the composition of the embodiment of FIG. 1.

In the above described arrangement, the incident light 11 from the overhead direction, i.e. a large quantity of light from a designated direction, passes through the liquid crystal display part 30, and subsequently, the light is guided in an approximately perpendicular direction to the display part 53, i.e. in the thickness direction of the display part 53, by the fiber optic face plate 39. Accordingly, the light is guided in an approximately perpendicular direction to the specular reflector 38, and is reflected by the specular reflector 38 again in an approximately perpendicular direction to the display part 53, i.e. in the thickness direction of the display part 53. The approximately perpendicular direction to the display part 53 corresponds to an approximately normal line direction, that is a line toward the viewer 40. Thus, the reflected light 12 is projected toward the viewer 40.

In other words, external light from a designated direction, which is transmitted through the liquid crystal display part operating as liquid crystal display means, is reflected by a reflection means comprising the fiber optic face plate 39 operating as a light guide means and the specular reflector 38 operating as a reflector to an approximately normal line direction.

On the other hand, in accordance with a function of the fiber optic face plate 39 operating as a light guide means, the incident light 11 and the reflected light 12 pass through light passages in the same direction. Accordingly, the light transmitted through the color filters 33, which are arranged prior or after the fiber optic face plate 39, passes through the color filter 33 of the same color. Therefore, as the reflected light does not pass through the color filters of the other colors, the brightness is maintained because the light is not absorbed by the color filters of the other colors.

The brightness characteristics of the display apparatus in the embodiment of FIG. 21 were determined in the typical office environment. As a result, reflected light distribution characteristics having a directivity approximately in the direction of the viewer 40 as a center with a half value width of 30 degrees were obtained. In the display characteristics, the brightness toward the viewer was the same as that of the embodiment of FIG. 18. And, a contrast ratio of the bright display to the dark display of over level 50 was obtained.

When using a display apparatus having 100 pixels (10× 10), each of the pixels has 300 $\mu$m×300 $\mu$m in width, for displaying bright and dark states per pixel, brightness of the bright display was hardly decreased. And, display characteristics having a high reflectivity and brightness were obtained, because a specular reflector 38 having no diffused plane was used.

Figure 22:
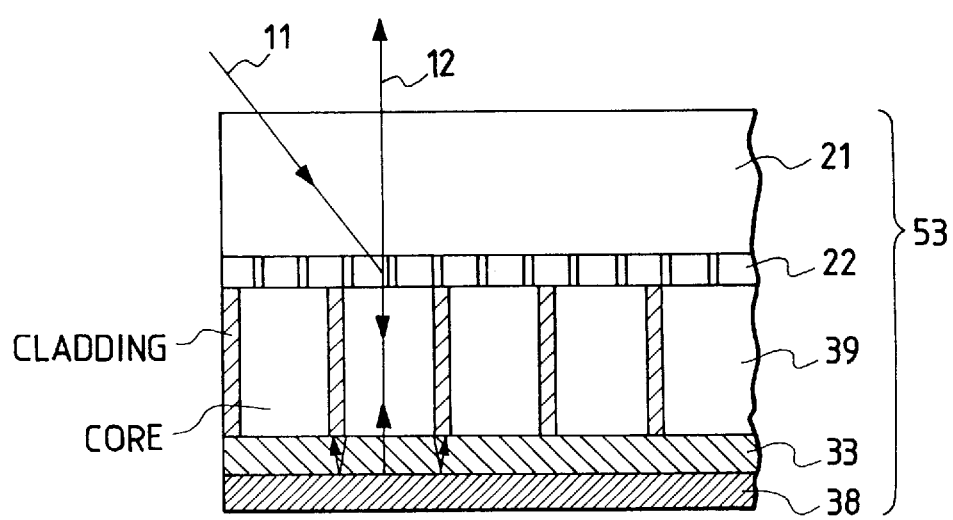
FIG. 22 is a cross sectional view illustrating an arrangement wherein the color filter 33 is arranged at the rear side of the display plane of the fiber optic face plate 39.

FIG. 22 is a cross section of a reflector which may be used in the embodiment of FIG. 21, wherein the color filter 33 is arranged at the rear side of the display plane of the fiber optic face plate 39.

As shown in FIG. 22, the light projected from the fiber optic face plate 39 enters into and is reflected from the specular reflector 38 in an approximately perpendicular direction. Although the projected light diffuses in a conical shape, the degree of the diffusion is small because the thickness of the color filter 33 is thin, and so the effects of the above conical diffused light is also small.

On the contrary, when the color filter 33 is arranged at the display plane side of the fiber optic face plate 39 as shown in FIG. 21, the incident light 11 from an oblique angle and the reflected light 12 along the normal line direction have a tendency to pass along different paths mutually, and the tendency causes an disadvantage.

In order to make the light transmit certainly through the color filter of the same color, the color filter must not be arranged at the display plane side of the fiber optic face plate 39, but must be arranged between the fiber optic face plate 39 and the specular reflector 38. Further, the fiber optic face plate 39, the color filter 33, and the specular reflector 38 are more preferably in tight contact with each other. If not, the diffused light in a conical shape is apt to pass through the color filters 33 of other colors, with the result that the brightness decreases due to absorption of the light.

Since the light passing through the cladding portion of the fiber optic face plate 39 does not pass through the same passage, a thin stripe filter which is the same as the color filter in the embodiment of FIG. 1 is preferable as the color filter 33, and the sizes of the filter stripes are preferably determined so as to avoid the cladding portion. In accordance with the above countermeasure, the effects of the light transmitting through the cladding portion can be eliminated, and the brightness can be maintained.

The advantage of the present invention can be well understood by comparison with the following prior art.

Figure 23:
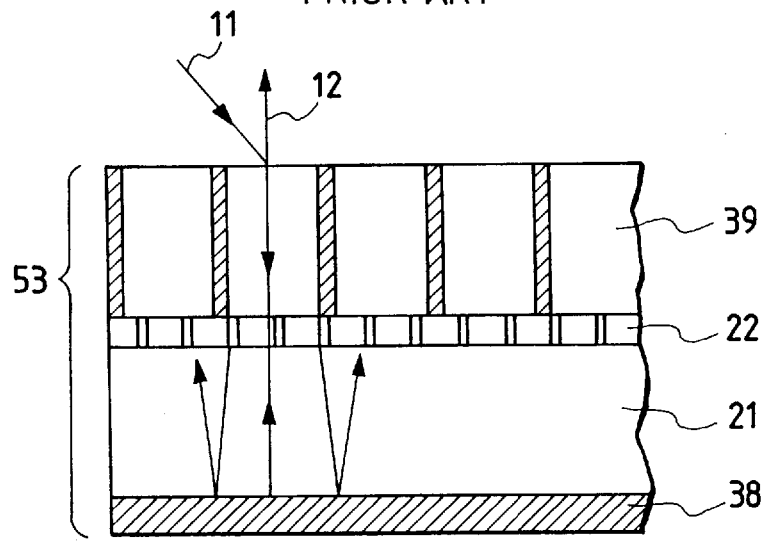
FIG. 23 is a cross sectional view illustrating the display part 53 of the prior art disclosed in JP-A-4-212124 (1992)
Figure 24:
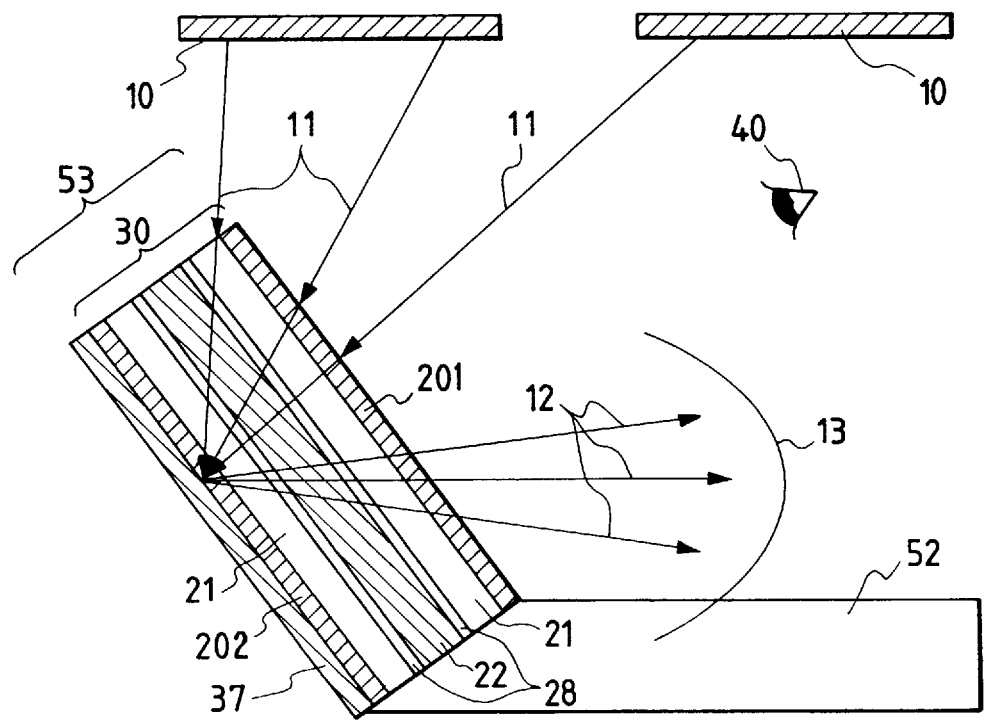
FIG. 24 is a side view partially in cross section illustrating an example of a conventional reflective liquid crystal display apparatus.
Figure 25:
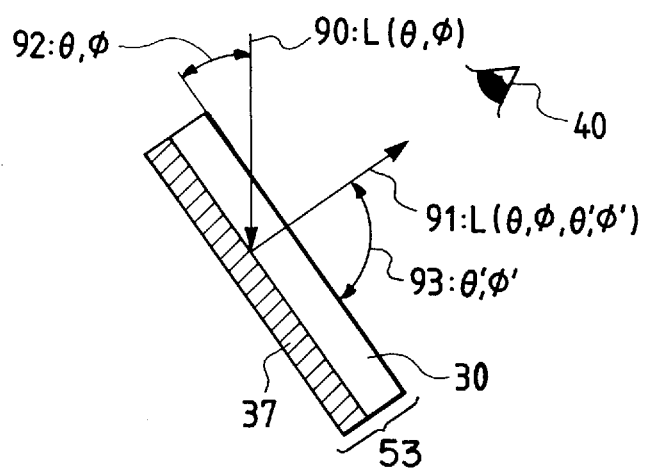
FIG. 25 is a detail view illustrating a model of the conventional reflective liquid crystal display apparatus.
Figure 26:
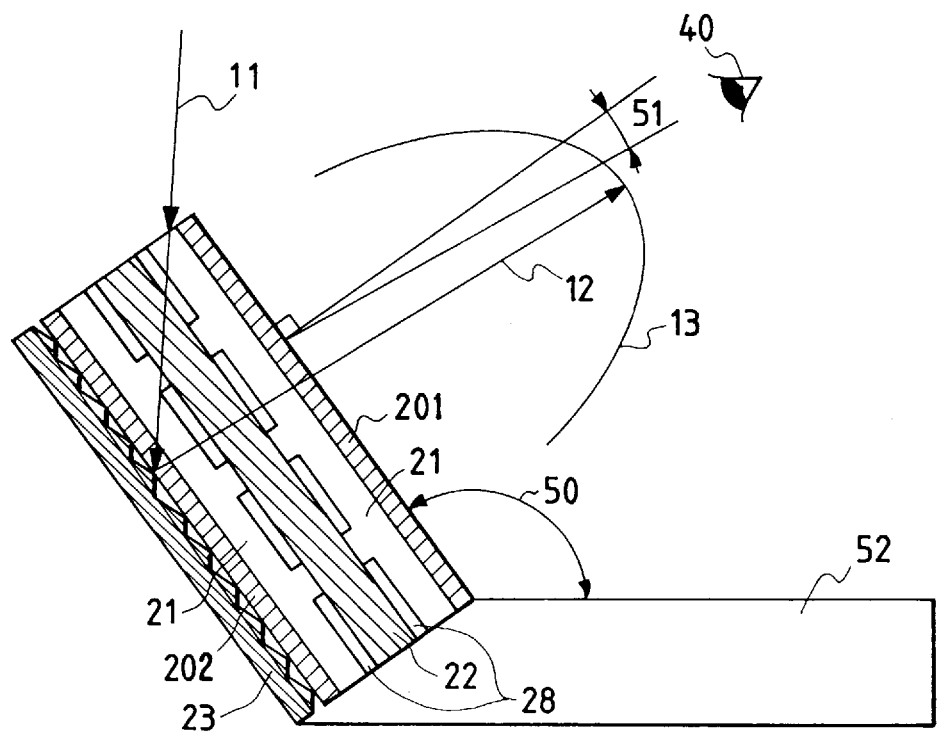
FIG. 26 is a side view partially in cross section illustrating a divided pixel arrangement of a conventional reflective liquid crystal display apparatus.

FIG. 23 is a cross section indicating a display part 53 of the prior art disclosed in JP-A-4-212124 (1992). The display part 53 is composed by laminating the fiber optic face plate 39, the liquid crystal layer 22, the substrate 21, and the specular reflector 38 in order from the display plane side of the display part 53.

The incident light 11 from an oblique angle is guided through the fiber optic face plate 39 in an approximately perpendicular direction, passes through the liquid crystal layer 22 and the substrate 21, and is reflected by the specular reflector 39. The reflected light 12 transmits the liquid crystal layer 22 and the substrate 21 again, and is projected toward the viewer 40 through the fiber optic face plate 39. As shown in FIG. 23, the light guided through the fiber optic face plate travels along a relatively long reciprocal passage, including the liquid crystal layer and the substrate, and diffuses in a relatively wide conical shape. As a result, a part of the reflected light is shielded by the liquid crystal layer for the dark display, and accordingly, the brightness is decreased.

The brightness characteristics of the display part of the prior art were comparatively determined in the typical office environment. As a result, the display part of the prior art indicates a significant decrease in the brightness of a bright display in comparison with the embodiment shown in FIG. 22, when a bright and dark check pattern was displayed. The thickness of the substrate 21 in the arrangement of FIG. 23 was 0.7–1.1 mm, and it was revealed that this thickness of the substrate 21 was sufficient to cause a delicate influence on the brightness. Therefore, the arrangement of the fiber optic face plate 39 in the embodiment of the present invention has been determined to be more preferable to that of the prior art. That means that the arrangement in the present embodiment shown in FIG. 22, wherein the substrate 21, the liquid crystal layer 22, and the fiber optic face plate 39 which operates as a light guide means, are arranged so that the incident external light 11 passes through the above members in order and is reflected by the specular reflector 38 so as to pass through the above members in a reverse order. The above condition is irrelevant to the existence of the color filters.

In a case when the fiber optic face plate was not used, but a substrate composed of normal glass material was used, it was necessary to provide the reflector with a scattering capability in order to avoid introducing reflected environmental images. However, if the fiber optic face plate 39 is used for a substrate, as in the present embodiment, scattering is caused in the fiber optic face plate when the light passes through the fiber optic face plate 39, and so it is unnecessary to provide the reflector with a scattering property. Therefore, the reflector could be a specular reflector 38, and the advantages of a high reflectivity and bright display characteristics were attained.

In accordance with the invention, it is also possible for the display part 53 using the fiber optic face plate 39 of FIG. 22 to be used in a horizontally disposed condition, as in the embodiment of FIG. 20.

Such an arrangement employs the fiber optic face plate 39 operating as a light guide means, wherein the respective fiber inside the plate is arranged obliquely toward the viewer 40 declined 30 degrees to the normal line direction. And, the reflector is a blaze reflector 23 having a blaze angle of 30 degrees, which is the same as the direction of the viewer. That is, when the viewer has a designated viewing angle, the light guide means has a light passage declined by the viewing angle, and a reflector has a reflecting plane declined by the viewing angle, and a function to reflect the incident light from the light guide means toward the viewer is imparted to the display part.

Further, the peak of the contrast ratio was moved so as to make the contrast ratio adequate by adjusting the declined angle of the respective fibers inside the fiber optic face plate 39, i.e. by adjusting the fibers so as to effect coincidence between the direction for increasing the contrast ratio and the direction of the fiber.

The brightness characteristics of the display apparatus in the present embodiment were determined in the typical office environment. As a result, bright display characteristics similar to those of the previous embodiment and a high contrast ratio were obtained.

As explained in the previous embodiments, a back light free, bright reflective color liquid crystal display apparatus equivalent to a transmissive colored liquid crystal display apparatus with back light could be obtained. Generally, about ⅔ of the consuming power of the conventional transmissive color liquid crystal display apparatus is consumed by the back light. Thus, a low power consuming and bright reflective color liquid crystal display apparatus can be obtained by eliminating use of the back light in accordance with the present invention.

Further, in all of the embodiments of the present invention, display characteristics having a high contrast ratio were obtained by preventing a decrease in the contrast ratio by light which will provide a visible barrier, because the direction of light which is reflected from the display plane or respective layers of the members to form a visible barrier differs from the direction of the normally reflected light reflected from the blaze reflector and other elements.

In accordance with the present invention, the blaze reflector 23 is manufactured by the steps of fabricating brass material into the shape of the blaze reflector, the surface of the blaze plane is roughened by a sand blast method, transcribing the reflector with UV-cured resins, and spattering silver on the surface. However, the blaze reflector is not necessarily restricted to this manufacturing method. For instance, the reflector can be manufactured by a casting method using a thermosetting plastic, such as polymethacrylate, or an embossing method on the plastic film. And, the surface of the reflector can be manufactured by a conventional method, such as spattering, vapor deposition, plating, and others.

In the described embodiments, the matching agent 32 is selected so as to be matched with the refractive index of the polarizers 201 and 202. However, it is very difficult to produce a close match in practice. Therefore, the blaze angle 24 is altered in order to adjust the refractive index of the selected matching agent 32 and set it so as to cause the reflected light 12 to be directed toward the viewer 40. Therefore, the matching agent can be selected with a wide freedom, and an economical advantage in the material cost of the matching agent can be realized.

In order to reflect the light received from the overhead direction, which constitutes a large quantity of light, toward the viewer effectively, it was revealed that the blaze angle in a range from 10 degrees to 50 degrees was preferable. Further, although the pitch of the grating in the present embodiments was selected from a range of 30 $\mu$m to 50 $\mu$m, the pitch of the grating is substantially not restricted so long as the pitch is smaller than the minimum pixel pitch, in which case the pitch can be selected from a wider range of 10 $\mu$m to 1 mm.

In a conventional reflective monochrome liquid crystal display apparatus, it was necessary to process the surface of the polarizer 201 at the display plane side with a non-glare treatment so as to decrease the reflected light from the polarizer 202 which might from a visible barrier. However, in accordance with the present invention, a display having a high contrast ratio can be obtained without the non-glare treatment at the surface of the polarizer 202, and an advantage of a reduced manufacturing cost is realized. Here, the non-glare treatment is a processing to roughen the surface of the polarizer for reducing the quantity of direct reflected light. An anti-reflection treatment is a similar processing for reducing the quantity of the reflected light, and the same advantage is realized.

Further, the present invention can be applied to a monochrome liquid crystal display apparatus obtained by eliminating the color filters 33 from the reflective color liquid crystal display apparatus of the described embodiments. By employing the reflective color liquid crystal display apparatus of the present invention as the display part of lap-top computers and note-book computers, and the display part of palm top computer and PDA (personal digital assistance) device, an information processing apparatus having a small consuming power, a high contrast ratio, and a preferable brightness can be obtained.

Figure 27:
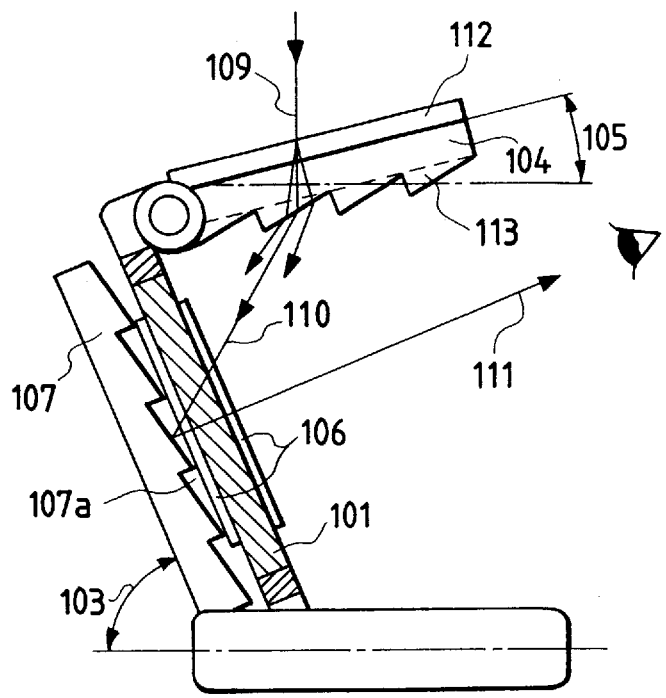
FIG. 27 is a diagrammatic view of the appearance of a liquid crystal display apparatus embodying the present invention.
Figure 28:
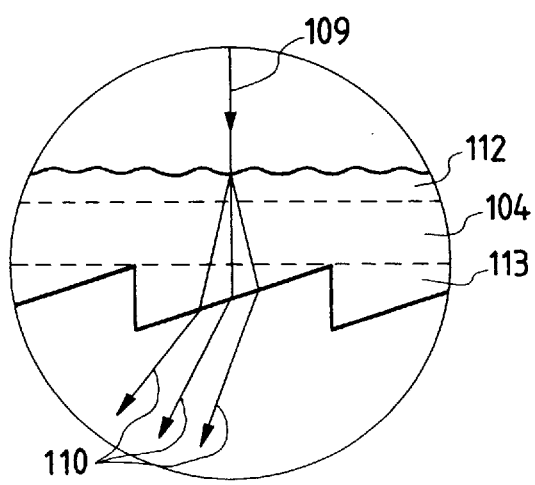
FIG. 28 is an enlarged vertical cross sectional view of the waveguide plate provided at the surface of the liquid crystal cell.
Figure 29:
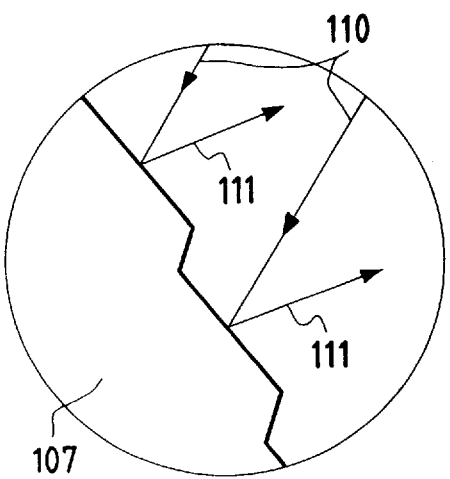
FIG. 29 is an enlarged vertical cross sectional view of the reflector.

FIG. 27 is a side view of a liquid crystal display apparatus of the present invention, FIG. 28 is an enlarged vertical cross sectional view of the waveguide plate 104 provided at the surface of the liquid crystal cell, and FIG. 29 is an enlarged vertical cross sectional view of the reflector 107.

In the present embodiment, an angle 103 formed by the liquid crystal cell plane and the horizontal plane was set at 60 degrees. A waveguide plate 104 made of acrylate resin is provided onto the upper surface of the liquid cell 101 and an angle 105 formed by the waveguide plate 104 and the horizontal plane was set at 30 degrees. A light scattering structure 112 is formed at the upper surface of the waveguide plate, as shown in FIG. 28, and a microprism 113 is provided at the lower surface of the waveguide plate so that the incident light 110 to the liquid crystal cell projected from the lower surface of the waveguide plate is refracted to propagate in the liquid crystal cell direction. The light scattering structure 112 in the present embodiment is a minute uneven structure, but any structure having a light scattering property can be used notwithstanding the above example. For instance, a flat plate structure having a minutely varying refractive distribution can be used. The incident light 109 is scattered by the light scattering structure 112, and becomes an incident light 110 by the wave guide plate 104. The incident light 110 is reflected by a reflector 107, which is arranged at a rear surface of the liquid crystal cell, and reaches the user's eyes as projected light 111. An interval 107a between the reflector 107 and the liquid crystal cell is filled with a transparent medium having a similar reflective index as the substrate in order to decrease reflection at the boundary. The incident light 110 projected from lower surface of the waveguide plate to the liquid crystal cell is reflected by the reflector 107 at the rear side of the liquid crystal cell 101, which is disposed between two polarizers 106. The reflector is composed of a large amount of minute planes which are declined upward toward the liquid crystal cell plane, as shown in FIG. 29, and the incident light 110 from the overhead direction is not reflected downward by the reflector, but propagates to an approximately perpendicular direction with respect to the liquid crystal cell plane as a reflective light 111, and reaches the user's eyes. Silicone oil, a transparent medium, is filled in the space between the reflector and the liquid crystal cell. The surface of the polarizer is flat, and non-glare treatment is not applied.

Figure 32:
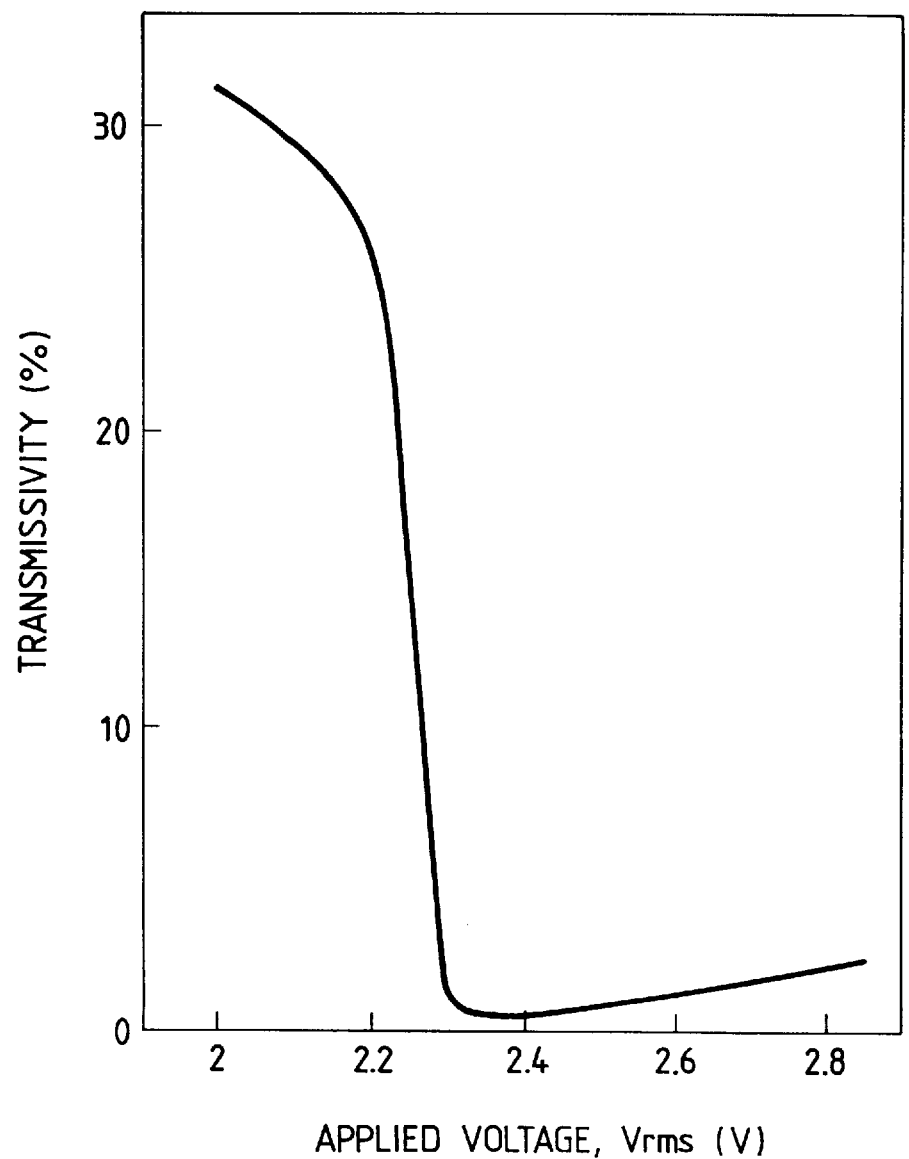
FIG. 32 is a graph indicating the relationship between an applied voltage and the brightness of a normally open type liquid crystal element.
Figure 33:
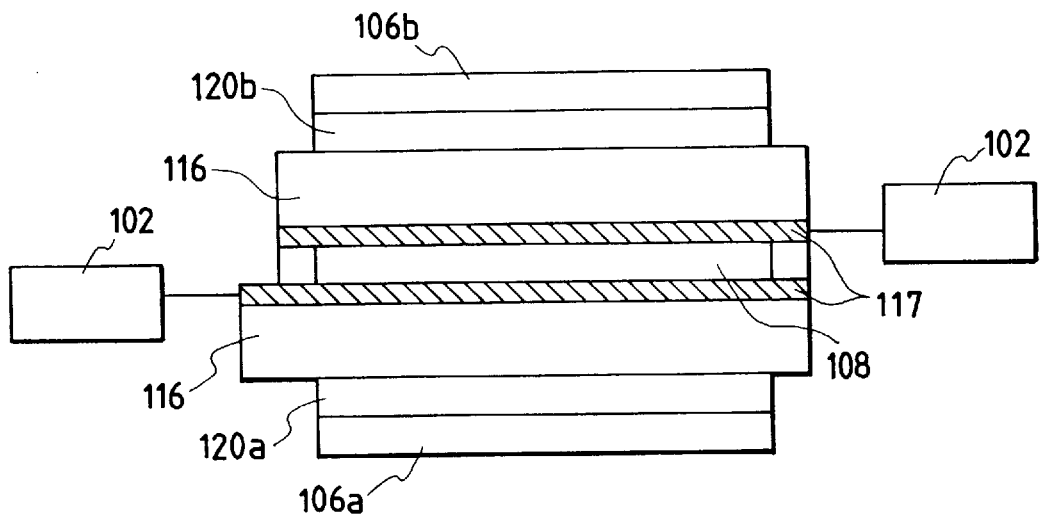
FIG. 33 is a schematic diagram illustrating the composition of a normally open type liquid crystal element.

As for the substrates in the present embodiment, two transparent glass substrates 115 were used as shown in FIG. 33. The respective glass substrates 116 were 1.1 mm thick, an optical polishing was performed on surface of the substrate, a transparent electrode 117 in a XY matrix pattern connected to a driver IC 102 was formed inside the substrate, and 640×480 pixels were formed. The size of the panel was 9.4 inches diagonally. Between the above substrates there was disposed a liquid crystal composition consisting of a nematic liquid crystal ZLI-2293 (made by Merck Co.) having a small amount of chiral material S811 (made by Merck Co.) as an additive. The natural pitch of the composition was 10.5 $\mu$m, and the gap between the substrates was 6.1 $\mu$m. A polyimide group alignment layer LQ-1800 (made by Hitachi Chemical Co.) was applied to approximately 500 Å onto the electrode by a spin coating method. Surface was treated effected by a rubbing method, and a pretilt angle of 5 degrees and a twist angle of 240 degrees were generated at the liquid crystal material. A constant gap of 6.1 $\mu$m was retained by bead spacers made of divinylbenzene of 6.3 $\mu$m in diameter. Polarizers 106a, 106b, (made by Nitto Denko Co., NPF-F1225DU) and retardation films 120a, 120b were arranged as shown in FIG. 33, and the normally open characteristics shown in FIG. 32. By making it normally open, the transmissivity of the incident light from an oblique angle was increased, and an improvement in the utilization efficiency of light by the present invention was achieved.

The liquid crystal display apparatus of the present embodiment was placed approximately just under a fluorescent lamp in an office having a fluorescent lamp at its ceiling, and the display performance was observed. The illuminance at the place where the liquid crystal display apparatus was placed, in a vertically overhead direction, was 800 lux. Drive was performed by a multiplex drive with a ¹⁄₂₄₀ duty and ¹⁄₁₃ vias. The brightness at the surface of the liquid crystal cell was determined by a luminance meter from a direction perpendicular to the liquid crystal cell. As the result, the brightness was 52 cd/mm² in the bright display condition, and a sufficiently bright and clear display without a light source was obtained.

The waveguide plate 104 at the upper surface of the liquid crystal cell 101 in the embodiment of FIG. 27 was eliminated, and the reflector 107 was replaced by a conventional one having non-directivity and symmetrical characteristics to provide a comparative example. The comparative example was placed approximately just under a fluorescent lamp in an office having a fluorescent lamp at its ceiling as provided for the embodiment of FIG. 27, and the display performance was observed. As a result, the brightness obtained in the bright display condition was only 7 cd/m², and the display was darker and more unclear than a transmissive display having a back light.

Further, using a structure wherein the surface of the waveguide plate 104 of the embodiment of FIG. 27 was flattened for eliminating the light scattering property, and in which the surface of the reflector was roughened for adding a light scattering property, the display performance was determined by the same method as above. As a result, the brightness obtained in the bright display condition was increased to 34 cd/m², and a clear display was obtained without a light source for the liquid crystal cell.

In the present embodiment, a reflector having unsymmetrical reflection characteristics was used for a preferable composition. However, even if a reflector having conventional symmetrical reflection characteristics and small diffusivity is used, a display condition brighter than the above comparative example as 18 cd/m² was obtained.

Figure 30:
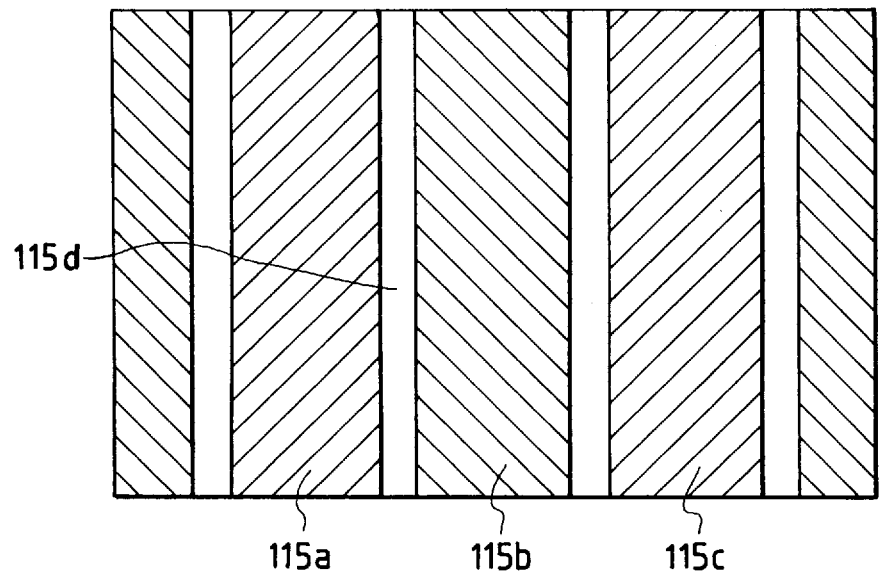
FIG. 30 is a schematic front view of the liquid crystal panel for use in an embodiment provided with color filters.
Figure 31:
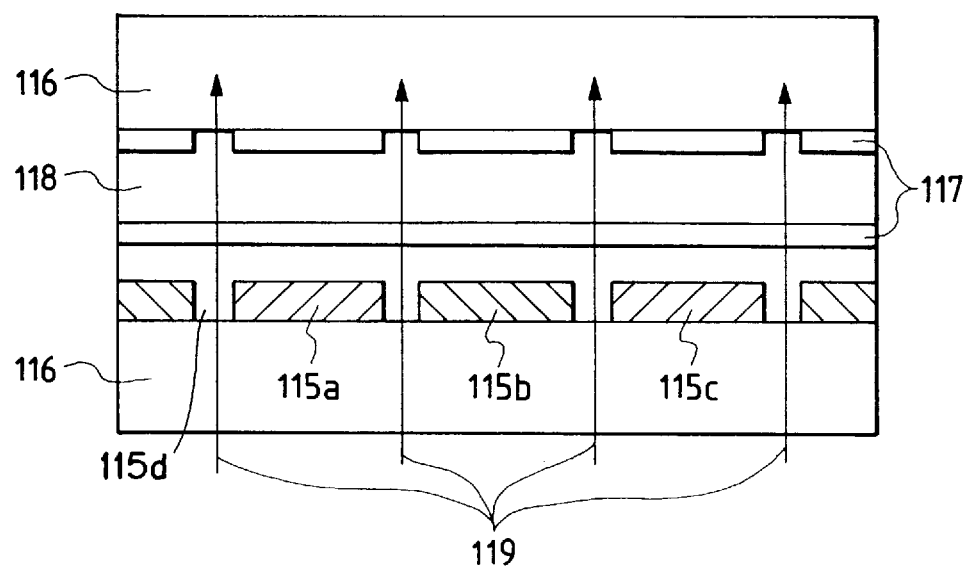
FIG. 31 is a schematic side view of the liquid crystal panel for use in an embodiment provided with color filters.

In addition, the color filter 115 shown in FIGS. 30 and 31 can be provided in the structure in the above embodiment of FIG. 27. The liquid crystal layer 118 is held between a pair of glass substrates 116, whereon the transparent electrodes 117 are arranged. Color filters 115a, 115b and 115c are arranged under the transparent electrode at the lower substrate 116. In contrast to the conventional color filter used for a general transmissive liquid crystal display apparatus, this color filter does not have any shield layers among the plural color filters 115a, 115b, 115c, indicating the three primary colors (indicated in this description as red (R), green (G), and blue (B)). The three primary colors also can be replaced by cyan (C), magenta (M), and yellow (Y). Further, in accordance with the present embodiment, it is possible not only to eliminate the shield layers, but also to form transparent gaps 115d among the color filters 115a, 115b, 115c, for obtaining a preferable structure in which much of the incident light 119 as shown in FIG. 31 is transmitted through the gaps. The advantage of an improved utilization efficiency of the light can be obtained even if the gap is covered with one or two kinds of the above filter instead of providing the transparent gaps, because the gaps still have an effect to transmit external light. The respective stripe color filter layer is 60 $\mu$m wide (area ratio 60%), and the transparent gap between the color filters is 40 $\mu$m wide (area ratio 40%).

Figure 34:
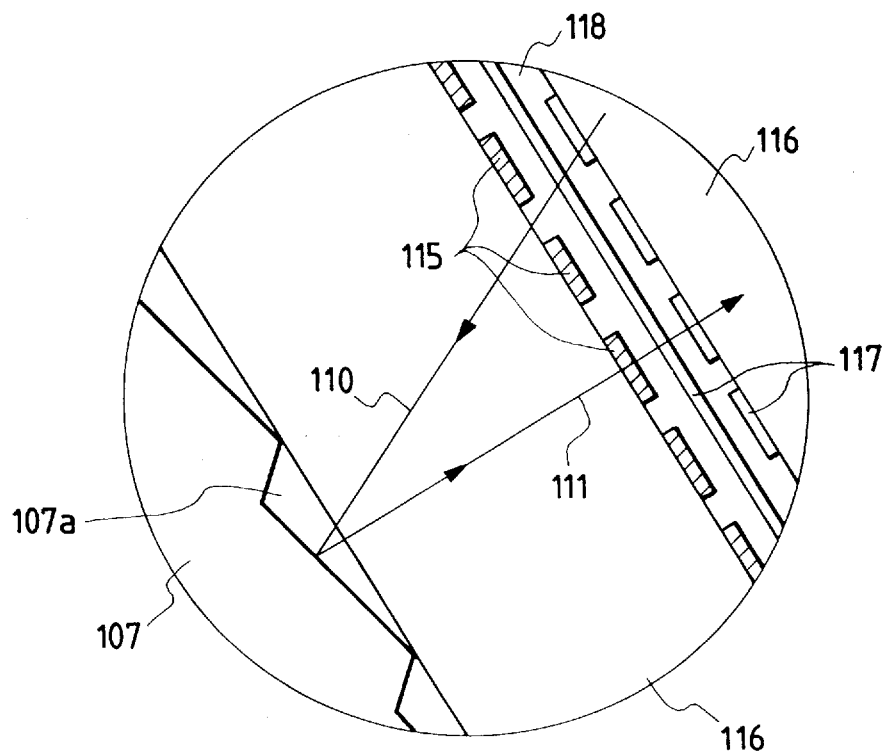
FIG. 34 is an enlarged cross sectional view of an arrangement provided with color filters.

In comparison with the embodiment of FIG. 27, which does not use any color filter, the utilization efficiency of light at the portion of area ratio 60% being located with the color filters is approximately ⅓, and accordingly, the total utilization efficiency of light is about 60% (0.6/3+0.4). Therefore, a brightness of approximately 31 cd/m² (52×0.6= 31) can be obtained, and a display apparatus having sufficient brightness without a back light can be obtained. Further, if all the color filters and the transparent gaps are placed in parallel with the horizontal plane (perpendicular to the drawing in FIG. 34), most of the incident light 110 to the liquid crystal cell reaches the user's eyes through the color filters 115 on the way back after being reflected from the reflector, and consequently, the contrast is improved.

Figure 35:
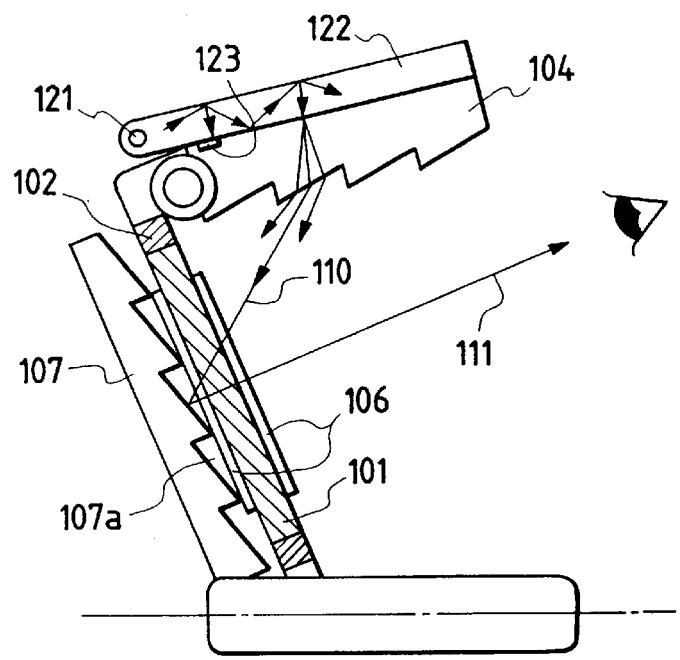
FIG. 35 is a diagrammatic view showing the appearance of a liquid crystal display apparatus provided with an auxiliary light source in accordance with the present invention.

An embodiment wherein a light source system 122 is added to the structure of the embodiment of FIG. 27 is shown in FIG. 35. The light source system 122 is composed of a transparent body which contains a light source 121 at the side end portion as shown in FIG. 35, and concurrently has a property that the light from the light source is reflected at the upper plane of the transparent body and is transmitted through the lower plane of the transparent body to the waveguide plate 104. By placing the light source system 122 onto the waveguide plate 104, the light source 121 is automatically turned on by an operation of the switch 123. In an ordinary bright environment, the display apparatus is used with external light which is guided to the surface of the liquid crystal cell without the light source system 122, and is used with the light source only in a very dark environment. Accordingly, use of a battery can be saved.

Figure 36:
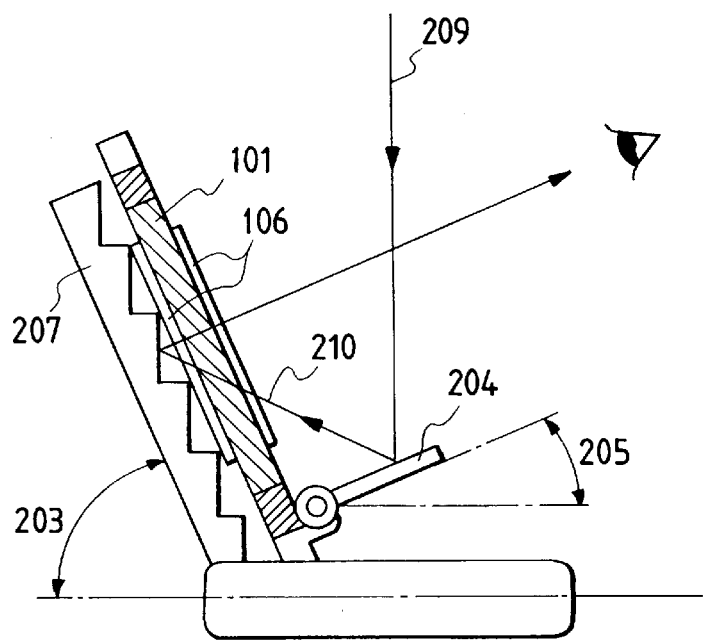
FIG. 36 is a diagrammatic view showing the appearance of a liquid crystal display apparatus of the present invention.
Figure 37:
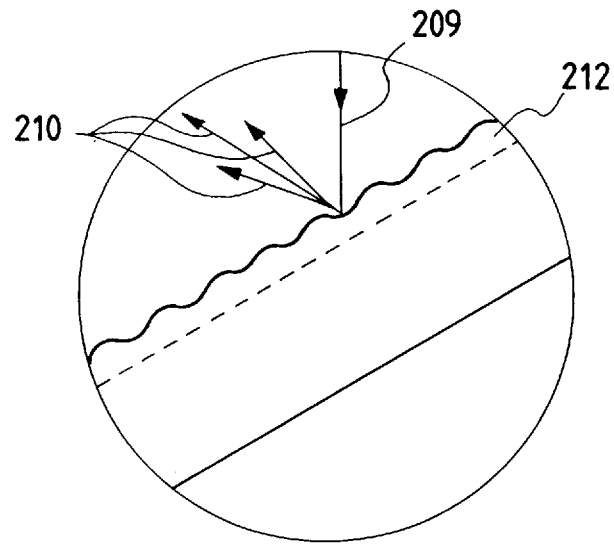
FIG. 37 is an enlarged side view of the reflective waveguide plate.

FIG. 36 illustrates a liquid crystal display apparatus of the present invention, and FIG. 37 is a side cross sectional view of the waveguide plate 204 provided at a lower plane of the liquid crystal cell. The side cross section of the reflector 207 is the same as in FIG. 29.

In the present embodiment, an angle 203 formed by the liquid crystal cell surface and the horizontal plane was set at 60 degrees. A white reflective waveguide plate 204 was provided at a lower plane of the liquid crystal cell, and an angle 205 formed by the waveguide plate and the horizontal plane was set at 30 degrees. A light scattering structure 212 was provided at the upper surface of the waveguide plate as shown in FIG. 37 so that the external light 209 was diffused so as to reflect light of high intensity in the liquid crystal direction. The light scattering structure 212 of the present invention is a fine uneven structure, but the light scattering structure is not restricted thereto, and any structure can be used if it has a light scattering property. For instance, a flat plate shaped structure having a fine refractive index distribution can be used. The light 210 incident to the liquid crystal cell, which is reflected by a reflective waveguide plate, is reflected by the reflector 207 at the rear side of the liquid crystal cell 101, which is held between two polarizers 206. The reflecting plane of the reflector is composed of a large number of fine planes declined downward to the liquid crystal cell plane, as shown in FIG. 29, and the incident light is not reflected upward as by a conventional reflector, but propagates in a perpendicular direction to the plane of the liquid crystal cell, and reaches the user's eyes with a high intensity. Here, the local surface structure of the declined fine plane structure is a specular structure. Silicone oil, which is a transparent medium, is filled into a space between the reflector and the liquid crystal cell, and accordingly, loss by reflection at the air surface is almost zero. The surface of the polarizer is flat, and is not treated with a non-glare processing. In the present embodiment, the liquid crystal display part composed of the glass substrate, nematic liquid crystal, polarizer, retardation film, and others used in the embodiment of FIG. 27 are used. The liquid crystal display apparatus of the present embodiment was placed approximately just under a fluorescent lamp in an office having a fluorescent lamp at its ceiling, and the display performance was observed. The illuminance where the liquid crystal display apparatus was placed, in a vertically overhead direction, was 800 lux. Drive was performed by a multiplex drive with 1/240 duty and 1/13 vias. The brightness at the surface of the liquid crystal cell was determined by a luminance meter from a direction perpendicular to the liquid crystal cell. As a result, the brightness was 48 cd/m² in the bright display condition, and a sufficiently bright and clear display without a light source was obtained.

The reflective waveguide plate 204 in the embodiment of FIG. 36 was eliminated, and the reflector 207 was exchanged with a conventional one having non-directivity and symmetrical characteristics to produce a comparative example. The comparative example was then placed approximately just under a fluorescent lamp in an office having a fluorescent lamp at its ceiling as in the embodiment of FIG. 36, and the display performance was observed. As a result, the brightness obtained in the bright display condition was only 7 cd/m², and the display was dark and unclear.

Further, using a structure, wherein the surface of the reflective waveguide plate 204 of the embodiment of FIG. 36 was flattened for eliminating the light scattering property, and wherein the partial surface of the reflector 207 was roughened for adding a light scattering property, the display performance was determined by the same method as above. As a result, the brightness obtained in the bright display condition was increased to 38 cd/m², and a clear display without reflected images of the light source at the ceiling was obtained without a light source for the liquid crystal cell.

Further, by using the color filters described in with reference to FIG. 30, a colored liquid crystal display apparatus can be realized.

In comparison with the embodiment of FIG. 36, which does not use any color filter, the utilization efficiency of light at the portion of area ratio 60% at which the color filters are located is approximately 1/3, and accordingly, the total utilization efficiency of light is about 60% (0.6/3+0.4). Therefore, a brightness of approximately 29 cd/m² (48×0.6= 31) can be obtained, and a display apparatus having sufficient brightness without a back light can be obtained.

Figure 38:
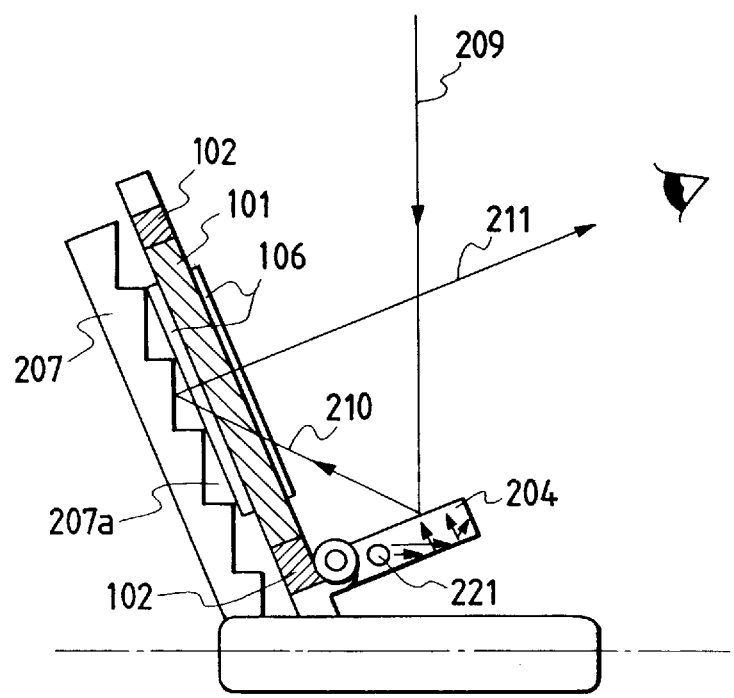
FIG. 38 is a diagrammatic view showing the appearance of a liquid crystal display apparatus provided with a light source according to the present invention.

Further, an embodiment wherein an additional light source 221 is added to the arrangement in FIG. 36 is shown in FIG. 38. The light source 221 is provided at a side plane of the reflective waveguide plate. The light source is turned off in an ordinary bright environment and uses external light by guiding the external light to the liquid crystal cell, and is turned on and is used in a very dark environment. Accordingly, use of the battery can be saved.

Figure 39:
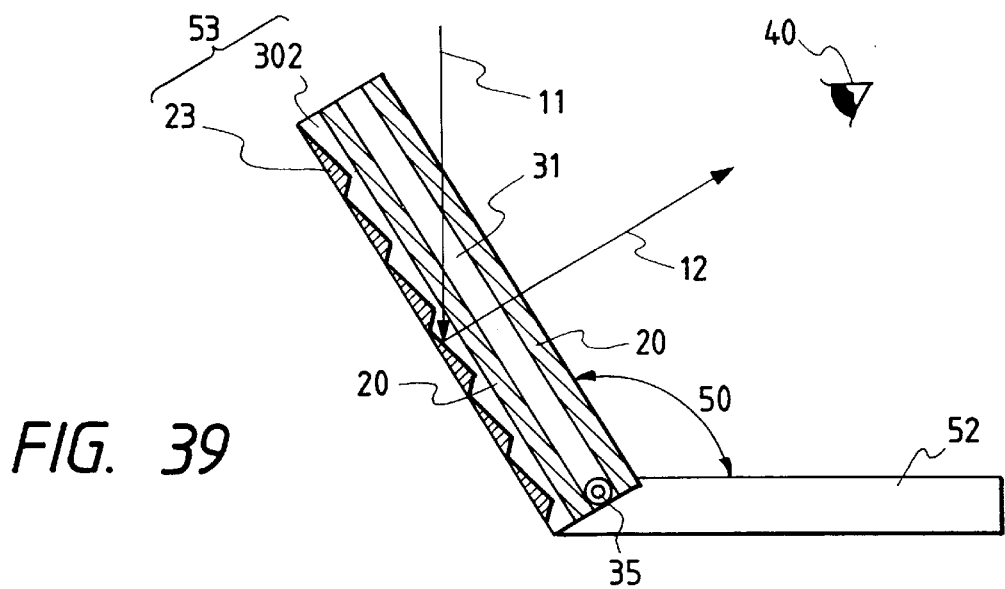
FIG. 39 is a side view partially in cross section illustrating the composition of the reflective liquid crystal display apparatus forming another embodiment of the present invention.

FIG. 39 is a side view partially in cross section of a reflective liquid crystal display apparatus in accordance with the present invention. The apparatus is composed of a display part 53 and a processing part 52, and the display part 53 and the processing part 52 are combined with an angle setting means 35 which sets the angle 50 of the display part 53 with respect to the horizontal.

The display part 53 comprises a pair of polarizers 20, a liquid crystal display part 30 comprising a liquid crystal element 31, a blaze reflector 23, and a light scattering medium 302. That is, the polarizers 20 are arranged at both sides of the liquid crystal element 31, and, in a case of a reflective color liquid crystal display apparatus, color filters are arranged in a manner as shown in FIG. 1.

In the embodiment of FIG. 1, the blaze plane of the blaze reflector 23 was roughened in order to provide a scattering property to the reflector 12. However, if a metallic specular plane is roughened, the reflectance decreases on account of multiple reflection at the roughened plane. Therefore, in the present embodiment, the blaze reflector is made specular, and a light scattering medium 302 is arranged in place of the matching agent 32 in the embodiment of FIG. 1.

As for the light scattering medium 302, a composition was used, which consisted of bisphenol A type epoxy resin (EP827, epoxy equivalent 180) 50 (as weight ratio, same hereinafter) and methyl hexahydrophthalic anhydride (NH8210, acid equivalent 162) 50 as a transparent medium, a small amount of 2-ethyl-4-methyl imidazole as a curing agent, and a transparent material, PMMA (poly methyl methacrylate), 20 of particle size approximately 20 Mm in diameter having a different refractive index from that of the transparent medium. Here, the refractive index of the transparent medium including EP827 and NH8210 was 1.53, and the refractive index of PMMA was 1.49. The above difference in refractive index, 0.04, operates as the light scattering medium. Although a thermosetting resin is used in the present embodiment, there is no restriction in the medium to be used if scattering can be obtained without any absorption by the medium.

The light scattering medium 302 is a thermosetting type, and is applied so as to be 50 μm thick between the blaze reflector 23 and the polarizer 20 and is cured at 100° C. for 2 hours. Since the light scattering medium does not absorb light, scattering is performed without absorption. Therefore, multiple reflection by the blaze reflector 23 can be prevented, and the reflectivity was improved by 1.3 times in comparison with the embodiment of FIG. 1. That means that the same scattering as the embodiment of FIG. 1 was obtained, and the brightness of the display in a direction toward the user's eyes 40 was improved by 1.3 times.

In the present embodiment, PMMA was mixed with the transparent medium (EP827 and NH8210) in order to make the difference in refractive index 0.04, and the film thickness of the light scattering medium 302 was 50 µm. However, when the film thickness is thinner than the present embodiment, the same effect can be obtained by increasing the difference in the refractive indices, or increasing the amount of the mixed transparent material. In this case, the sign of the difference of the refractive indices of the transparent medium and the transparent material is irrelevant to the effect. However, less back scattering of the scattering medium 302, a transparent material which is larger than the wavelength of visible light, and a less difference of the refractive index are preferable. That is, the size of the transparent material to be mixed is preferably larger than 0.5 µm, and the difference of the refractive index is preferably larger than 0.01 and smaller than 0.3. A so-called anomalous diffusion domain is preferable.

When the back scattering of the light scattering medium 302 is large, it is necessary to decrease the back scattering in order to prevent loss in the directivity of the blaze reflector.

The other composition of the liquid crystal layer and the effect of the blaze reflector are as same as the ones explained previously in the embodiment of FIG. 1.

Figure 40:
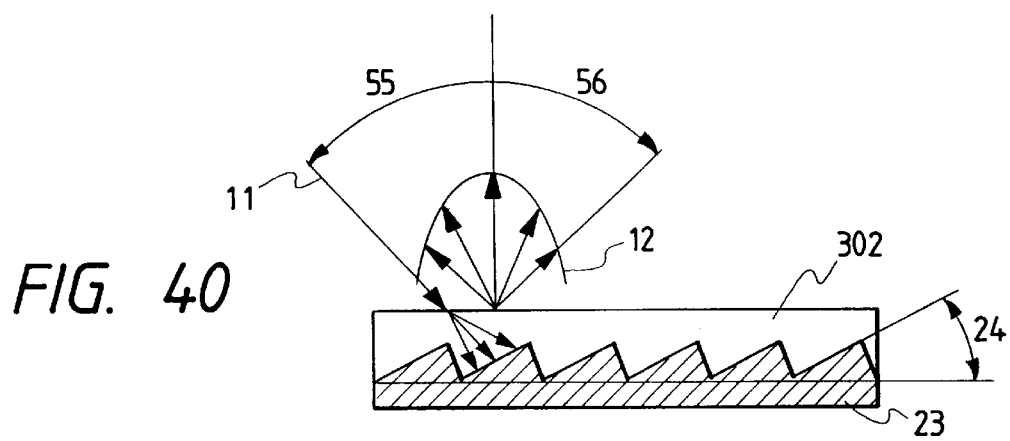
FIG. 40 is a cross sectional view of the reflector 302 in the apparatus shown FIG. 11.
Figure 41:
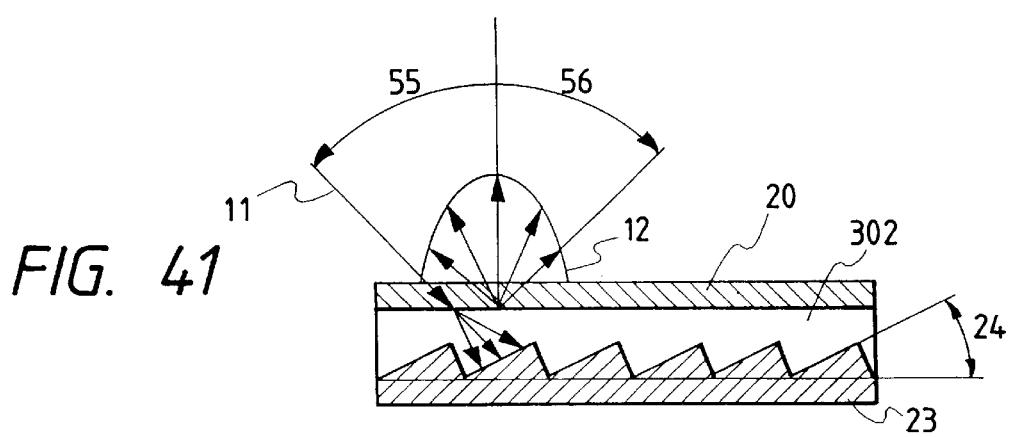
FIG. 41 is a cross sectional view of a polarizing reflector in accordance with the present invention.

The composition of the reflector and the polarizing reflector used in the arrangement of FIG. 39 are shown in FIGS. 40 and 41, respectively. The blaze angle 24 is set at 20 degrees, and the blaze groove width are 35 µm as in the embodiment of FIG. 1. In accordance with this composition, the incident light 11 is scattered by the light scattering medium 302, is provided with directivity by the blaze reflector 23, and consequently, reflection characteristics wherein the peak of the intensity is in a direction normal to the reflector were obtained. The incident light 11 with the incident angle 55 is scattered by the light scattering medium 302, and the peak intensity of the reflected light is determined by the refractive index of the scattering medium 302 and blaze angle 24 of the blaze reflector 23. In the present embodiment, the reflected light is projected in a direction normal to the reflector when the incident angle 55 is 60 degrees. The intensity of the projected light having the projection angle 56 of the same value and a reverse sign to the incident angle 55 is less than ½ of the intensity of the projection light in a direction normal to the reflector. Accordingly, a highly bright reflector having a directivity could be achieved by using the light scattering medium 302 of FIG. 39 as a light scattering medium.

Further, a polarizing reflector can be prepared by bonding the polarizer 20 to the reflector 23 using the light scattering medium 302 as an adhesive agent and providing a film as shown in FIG. 41. By integrating this with the polarizer 20, reflection loss at the boundary of the polarizer 20 can be prevented, and the reflectivity can be increased.

In the arrangements of FIGS. 39 to 41, a specular plane prepared by deposition of silver onto the blaze reflector was used, but another metal having a high reflectivity, such as aluminum, can be used.

Further, the reflector described with reference to FIGS. 39 to 41 could be used in the previously described embodiments, and in this way, the brightness of the reflector in the normal direction can be increased by approximately 30%.

What is claimed is:

1. Reflective liquid crystal display apparatus comprising:

liquid crystal display means composed of at least a liquid crystal layer, and a pair of polarizers holding said liquid crystal layer, for displaying bright and dark states in a mode wherein external light passing through the liquid crystal layer in an approximately normal direction to a displaying plane, is transmitted or shielded, respectively; and reflecting means for reflecting external light which has been transmitted through said liquid crystal display apparatus; wherein said liquid crystal display means has transmission characteristics such that it can transmit external light in a designated direction, other than said approximately normal direction to the displaying plane, even in a shield mode for external light; and said reflecting means is positioned to receive external light passing through said liquid crystal display means in said designated direction, and to reflect the received external light once again through said liquid crystal display means in said approximately normal direction to the displaying plane;

wherein said reflecting means comprises:

waveguide means for guiding light in a designated direction; and a reflector for reflecting light received from said waveguide means back through said waveguide means.

2. Reflective color liquid crystal display apparatus comprising:

liquid crystal display means composed of at least a liquid crystal layer for displaying bright and dark states by transmitting and shielding external light, respectively;

reflecting means for reflecting external light which has been transmitted through said liquid crystal display layer; and a color filter positioned so that said external light is transmitted therethrough; wherein said color filter is a stripe filter for respective colors, and the direction of the color filter stripes is parallel to the direction of incident light and reflected light by said reflecting means said reflecting means is a blaze reflector having blaze shaped reflecting planes, and said blaze reflector is arranged so that the direction of the blaze grooves of said blaze reflector crosses almost perpendicularly with the direction of the stripes in said stripe filter.

3. Reflective color liquid crystal display apparatus comprising:

liquid crystal display means for display of bright and dark states by transmitting and shielding external light, respectively;

reflecting means for reflecting external light which has been transmitted through said liquid crystal display means; and an indirect irradiation means for reflecting external light and for irradiating said liquid crystal display means therewith.

4. Reflective liquid crystal display apparatus comprising:
means including at least a waveguide plate, a liquid crystal layer, a substrate, and a reflector, for displaying bright and dark states by reciprocating transmission of external light through said waveguide plate, said liquid crystal layer, and said substrate through reflection of said external light at said reflector, wherein said substrate, said liquid crystal layer, and said waveguide means are arranged so that said external light is transmitted to said reflector through said substrate, the liquid crystal layer, and the waveguide plate in that order, and is reflected at said reflector back through said waveguide plate, the liquid crystal layer, and the substrate.

5. Liquid crystal display apparatus comprising:
a liquid crystal cell composed of at least:
  (a) a pair of substrates, at least one of which is transparent;
  (b) a liquid crystal composition layer having an electrode provided on either side thereof and being sandwiched between said pair of substrates; and
  (c) polarizing means for altering the transmissivity of light depending on the configuration of liquid crystal molecules in said liquid crystal composition layer; and driving means for driving said liquid crystal layer; wherein an angle formed by said liquid crystal cell plane and a horizontal plane is at least 45 degrees;

a waveguide plate is provided on at least one side of said liquid crystal cell;

an angle formed by the plane of said waveguide plate and a horizontal plane is less than 45 degrees; and said waveguide plate has a structure for guiding incident light to a surface of said liquid crystal cell.

6. Liquid crystal display apparatus comprising:
a liquid crystal cell composed of at least:
  (a) a pair of substrates, at least one of which is transparent;
  (b) a liquid crystal composition layer having an electrode provided on either side thereof and being sandwiched between said pair of substrates; and
  (c) polarizing means for altering one of the transmissivity and reflectivity of light depending on the configuration of liquid crystal molecules in said liquid crystal composition layer; and driving means for driving said liquid crystal layer; wherein a waveguide plate is provided on one side of said liquid crystal cell, and said waveguide plate has a structure to guide incident light to a surface of said liquid crystal cell, a reflector is provided at the bottom of said liquid crystal cell, and said reflector reflects incident light, which passes through said waveguide plate onto a surface of said liquid crystal cell, in a direction perpendicular to the surface of said liquid crystal cell, wherein a transparent medium is filled in a space between said liquid crystal cell and said reflector, wherein a surface of one of said waveguide plate and said reflector has a light scattering structure; and wherein the local surface structure of said reflector is a specular structure.

7. Liquid crystal display apparatus comprising:
a liquid crystal cell composed of at least:
  (a) a pair of substrates, at least one of which is transparent;
  (b) a liquid crystal composition layer having an electrode provided on either side thereof and being sandwiched between said pair of substrates; and
  (c) polarizing means for altering transmissivity or reflectivity of light depending on configuration of liquid crystal molecules in said liquid crystal composition layer; and driving means for driving said liquid crystal layer, wherein a waveguide plate is provided on said liquid crystal cell;

a light source system having a light source inside is provided on said waveguide plate, said light source system having a structure for guiding incident light to a surface of said liquid crystal cell when said light source is in a non-lighting condition; and a structure for guiding light from said light source to a surface of said liquid crystal cell by supporting said light source system in a predetermined position on said waveguide plate when said light source is in a lighting condition, further including a switch for turning on said light source automatically and a light reflector for directing light from said light source onto said waveguide plate.

8. Liquid crystal display comprising:
a liquid crystal cell composed of at least:
(a) a pair of substrates, at least one of which is transparent;
(b) an electrode provided on each of said substrates;
(c) a liquid crystal composition layer held between said substrates; and
(d) a polarizing means for altering the transmissivity and reflectivity of light depending on the configuration of liquid crystal molecules in said liquid crystal composition layer; and driving means for driving said liquid crystal composition layer, wherein an angle formed by said liquid crystal cell plane and a horizontal plane is at least 45 degrees;

a reflective waveguide plate provided under on one side of said liquid crystal cell, an angle formed by the plane of said reflective waveguide plate and a horizontal plane being less than 45 degrees, said reflective waveguide plate having a function for guiding incident light from said reflective waveguide plate to surface of said liquid crystal cell; and a reflector provided on the other side of said liquid crystal cell, said reflector having a function to reflect incident light from an oblique direction of the liquid crystal cell to mainly a direction perpendicular to a surface of said liquid crystal cell;

wherein said reflective waveguide plate comprises finely declined micromirrors, wherein a transparent medium is filled in a space between said liquid crystal cell and said reflector, wherein a surface of one of said reflective waveguide plate said reflector is provided with a light scattering property, and wherein said reflective waveguide plate comprises surface having white light scattering property wherein the local surface structure of said reflector is a specular structure.

9. Liquid crystal display apparatus comprising:
a liquid crystal cell composed of at least:
  (a) a pair of substrates, at least one of which is transparent;
  (b) an electrode provided on each of said substrates;

(c) a liquid crystal composition layer held between said substrates; and (d) a polarizing means for altering the transmissivity and reflectivity of light depending on the configuration of liquid crystal molecules in said liquid crystal composition layer; and driving means for driving said liquid crystal composition layer, wherein an angle formed by said liquid crystal cell plane and a horizontal plane is at least 45 degrees;

a reflective waveguide plate provided under on one side of said liquid crystal cell, an angle formed by the plane of said reflective waveguide plate and a horizontal plane being less than 45 degrees, said reflective waveguide plate having a function for guiding incident light from said reflective waveguide plate to surface of said liquid crystal cell; and a reflector provided on the other side of said liquid crystal cell, said reflector having a function to reflect incident light from an oblique direction of the liquid crystal cell to mainly a direction perpendicular to a surface of said liquid crystal cell;

wherein said reflective waveguide plate comprises finely declined micromirrors, wherein a transparent medium is filled in a space between said liquid crystal cell and said reflector, and wherein said reflective waveguide plate comprises surface having white light scattering property, and wherein each plane surface of said reflector and the boundary of said polarizer with air is locally flat and has a light transmissivity and said reflective waveguide plate is provided with a light scattering property.

10. Liquid crystal display apparatus comprising:

a liquid crystal cell composed of at least:

(a) a pair of substrates at least one of which is transparent;

(b) an electrode provided on each of said substrates;

(c) a liquid crystal composition layer held between said substrates; and (d) polarizing means for altering the transmissivity of light depending on the configuration of liquid crystal molecules in said liquid crystal composition layer;

driving means for driving said liquid crystal layer, wherein an angle formed by said liquid crystal cell plane and a horizontal plane is at least 45 degrees;

a reflective waveguide plate provided on one side of said liquid crystal cell; and a light source provided on a side of said reflective waveguide plate, said reflective waveguide plate having a function to guide incident light from said reflective waveguide plate to a surface of said liquid crystal cell when said light source is in a non-lighting condition, and a function to guide light from said light source to said liquid crystal cell by transmitting the light through an upper surface of said reflective waveguide plate when said light source is in a lighting condition.

11. Reflective liquid crystal display apparatus comprising:

a liquid crystal display means, composed of at least a liquid crystal layer and a pair of polarizers having said liquid crystal layer disposed therebetween, for displaying bright and dark states in modes for transmitting and shielding external light, respectively, in a direction approximately normal to a display plane; and reflecting means for reflecting said external light which has passed through said liquid crystal display means; wherein said liquid crystal display means has a property to transmit external light in a designated direction, other than in said direction approximately normal to the display plane, even if in a mode of shielding said external light;

said reflecting means reflects said external light, received in the designated direction through said liquid crystal display means, in said direction approximately normal to the display plane; and scattering means comprising at least two kinds of transparent mediums each having a different refractive index is provided between said reflecting means and said display means.

12. Reflective liquid crystal display apparatus comprising:

liquid crystal display means composed of a pair of substrates, a liquid crystal layer held between said pair of substrates, a pair of polarizers holding said pair of liquid crystal substrates, and a reflector formed on one of said pair of substrates;

said liquid crystal layer being composed of a nematic liquid crystal having a designated twist angle;

orientation films being formed on each of said pair of substrates facing each other;

absorbing axes of said polarizers and orientation directions of said orientation films being arranged so that both a transmission mode and a shielding mode are obtained, wherein in the transmission mode incident light approximately normal to a displaying plane passes through the liquid crystal layer, and in the shielding mode incident light in a direction other than The incident light approximately normal to the displaying plane passes through the liquid crystal layer and the incident light approximately normal to the displaying plane is shielded;

said reflector being a blaze reflector having a blaze shaped reflecting plane; and said blaze reflector being arranged so that incident light from an angle which obtains a maximum transmission of the incident light in said shielding mode is reflected to a direction where viewers are located.

13. Reflective liquid crystal display apparatus as claimed in claim 12, wherein the designated twist angle of the nematic liquid crystal layer is approximately 90 degrees.

14. Reflective liquid crystal display apparatus as claimed in claim 12, wherein the reflecting plane of said blaze reflector is composed of a blaze shaped reflecting plane having at least two kinds of declining angles.

15. Reflective liquid crystal display apparatus as claimed in claim 14, wherein said blaze reflector is arranged so that the direction where the viewers are located is approximately normal to said polarizers.

16. Reflective liquid crystal display apparatus as claimed in claim 15, wherein the orientation directions of said orientation films are arranged so as to be approximately in parallel with the absorbing axis of respective ones of said polarizers located adjacently to respective ones of said orientation files, and said absorbing axes of said polarizers are arranged so as to cross one another.

* * * * *